United States Patent [19]
Horiguchi

[11] Patent Number: 5,737,329
[45] Date of Patent: Apr. 7, 1998

[54] SPREAD SPECTRUM COMMUNICATION APPARATUS

[75] Inventor: Yoshinori Horiguchi, Kanagawa-ken, Japan

[73] Assignee: Kabushiki Kaisha Toshiba, Kawasaki, Japan

[21] Appl. No.: 631,199

[22] Filed: Apr. 12, 1996

[30] Foreign Application Priority Data

Apr. 14, 1995 [JP] Japan ................... 7-088980

[51] Int. Cl.$^6$ .................. H04J 3/06; H04J 13/00
[52] U.S. Cl. .......... 370/342; 370/507; 370/516; 375/206; 375/209; 375/356; 375/362
[58] Field of Search ................ 370/320, 335, 370/342, 350, 441, 465, 479, 503, 507, 516, 517, 518, 519, 522, 203, 208, 209; 375/200, 205, 206, 207, 208, 209, 210, 340, 354, 356, 357, 358, 371, 373, 375, 376, 362, 364, 365, 367, 368; 455/67.6, 67.7, 68, 69, 70, 92, 133, 137, 139, 352

[56] References Cited

U.S. PATENT DOCUMENTS

| | | | |
|---|---|---|---|
| 5,285,472 | 2/1994 | Leonard et al. | 375/208 |
| 5,375,141 | 12/1994 | Takahashi | 375/208 |
| 5,414,729 | 5/1995 | Fenton | 375/209 |
| 5,467,367 | 11/1995 | Izumi et al. | 375/206 |
| 5,581,547 | 12/1996 | Umeda | 375/209 |

FOREIGN PATENT DOCUMENTS

| | | |
|---|---|---|
| 61-227438 | 10/1986 | Japan . |
| 3-52346 | 3/1991 | Japan . |
| 4-360434 | 12/1992 | Japan . |

*Primary Examiner*—Wellington Chin
*Assistant Examiner*—Huy D. Vu
*Attorney, Agent, or Firm*—Cushman Darby & Cushman IP Group of Pillsbury Madison & Sutro LLP

[57] ABSTRACT

A spread spectrum communication apparatus for transmitting multiple signals such that signals transmitted from several transmitter-receivers can have the same PN code and yet not interfere with each other. A phase controller is used to control the phases of the PN codes from multiple transmitters so that the PN code phase is different for each transmitter. Thus, even though the same PN codes are transmitted, they all have different phases to prevent interference. This arrangement reduces the number of PN codes needed since only one PN code generator is needed for several receiver blocks.

10 Claims, 15 Drawing Sheets

SPREAD SPECTRUM COMMUNICATION APPARATUS

FIELD OF THE INVENTION

The present invention generally relates to a decoder, and more particularly, to a radio communication apparatus, and more particularly to a spread spectrum communication apparatus having superior security characteristics.

BACKGROUND OF THE INVENTION

The origin of the spread spectrum system was in the 1940s; however, the establishment of the basic tools for carrying the system out occurred in the 1960s. It was a relatively new research subject and for several reasons, such as the communication systems available at that time, adopting it was too expensive. Since it was a communicating method superior in secrecy and anti-interference, its practical uses were limited to communications needing high security, such as military affairs. However, it has received attention with respect to frequency efficiency in recent years. A CDMA (code dividing multiplexing system) of QUAL-COMM company has received particular attention in the moving communications field. This system has a far higher frequency utilizing efficiency than the conventional FDMA (frequency dividing multiplexing system) or TDMA (time dividing multiplexing system) for controlling a power density between a base station and a moving station.

The spread spectrum modulation is accomplished by multiplying a PN (pseudo noise) code with an information signal. If the different PN codes are multiplied with each piece of information needing to be transmitted, it will be possible to multiplex the PN code. CDMA uses the spread spectrum system, but since the object of CDMA is moving communication, one base station must maintain communication with many moving stations. Therefore, it will be hard to multiplex in installments using only the PN code. So, although the transmitted PN code is one code, the multiplexed signal is separated by using an orthogonal code based on a Walsh-function.

Accordingly, the CDMA has many complex uses and it would be an expensive system for the application in an audio-visual (AV) apparatus.

When the spread spectrum communication system is considered for use in consumer products, since the number of devices which are involved in the communication is few, the system would be simpler and less expensive if it takes the direct spread spectrum using the PN code, which is the original way of carrying out a spread spectrum system.

However, when bi-directional communication is considered, even if there are only a few devices used, many PN codes will be needed. For instance, when an M-sequence code in the PN code is used, there are only six types of codes generated by six stages of shift registers. When seven stages of shift registers are provided, 18 types of codes can be generated. Similarly, when eight stages of shift registers are provided, 36 types of codes can be generated. Further, when nine stages of shift registers are provided, 48 types of codes can be generated. That is, when a communication apparatus is controlled using only a PN code having the same code length as an M-sequence, a generator having at least nine stages of shift registers is needed. Further, the device is required to take into consideration the prevention of outside noises as well.

In the spread spectrum signal communication, the same PN code generators are required for both transmission and reception. Also, when performing multiple communications, the number of circuits required will increase. So, there have been problems in determining how to use the PN code effectively and how to reduce the scale of the PN code generators.

As described above, the conventional spread spectrum communication apparatus mentioned above had a problem with the large scale of the PN code generators since the apparatus needed the same PN code generators for both transmission and reception, and in case of multiple communications, the number of PN code generators needed increased in correspondence to the scale of the multiple communications.

SUMMARY OF THE INVENTION

It is, therefore, an object of the present invention to provide a spread spectrum communication apparatus which is able to perform multiple communications without requiring an increase in the scale of PN code generators.

One aspect of the spread spectrum communication apparatus according to the present invention includes a first transmitter-receiver comprising a receiver block for performing reverse spread spectrum processing of the spectrum by receiving a transmission signal which was spread spectrum processed using a first PN code and synchronizing the phase of the transmission signal to the first PN code, demodulating the reverse spread spectrum received signal and detecting whether the received signal synchronizes the phase to the first PN code to output the synchronization detecting signal, a control signal generator for generating a control signal to shift the phase of the first PN code for the spread spectrum processing to the other transmitter-receiver to establish the reception synchronization based on the synchronization detecting signal of the receiver block, and a transmitter block for multiplexing the controlled signal to information for transmission and performing a spread spectrum processing by a second PN code; a second transmitter-receiver comprising a receiver block for performing reverse spread spectrum processing of the spectrum by receiving the transmission signal which was spread spectrum processed in the transmitter-receiver and synchronizing the phase of the transmission signal to the second PN code, demodulating the received signal and separating the controlled signal from the received signal to output the controlled signal, a phase controller for generating a phase control signal to shift the phase of the first PN code for the spread spectrum processing to establish the reception synchronization of the second transmitter-receiver, which can not establish the reception synchronization based on the control signal separated from the receiver block, and a transmitter block for generating the first PN code using a clock pulse which synchronizes the phase to the spread spectrum demodulator of the receiver block, performing spread spectrum processing on an information signal for transmission using the first PN code and transmitting the information signal, and a phase shifter connected between the receiver block and the transmitter block of the second transmitter-receiver for shifting the phase of the first PN code based on the phase control signal of the receiver block in the second transmitter-receiver.

According to the arrangement as mentioned above, the PN code has correlation characteristics where an autocorrelation value becomes a reciprocal of a code length when their phases have differences over predetermined chip durations even though they are the same PN codes. The use of the correlation characteristics makes it possible to multiplex by controlling the phases of the PN codes even though the PN codes themselves are the same. So, it is possible for a phase controller to control the PN code phase of the transmitted signal so that the phases of the PN codes generated from several transmitter-receivers on an input terminal of another transmitter-receiver have differences over predetermined chip durations to prevent interference, even though the same PN codes are transmitted from several transmitter-receivers. Consequently, since it is possible to reduce the number of the PN codes which are allotted to the communication systems by a large amount, it will also be possible to reduce the number of stages in the PN code generator and the cost of the circuits. Further, in the transmitter-receiver corresponding to the base station, which has several receiver blocks, since only one PN code generator is enough for several receiver blocks, it will also be possible to reduce the number of PN code generators. Accordingly, multiplexing the channels using the phase controlling means of the transmitted PN code makes it possible to reduce the costs of the whole system.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the attached drawings; FIGS. 1 through 15.

Figure 1:
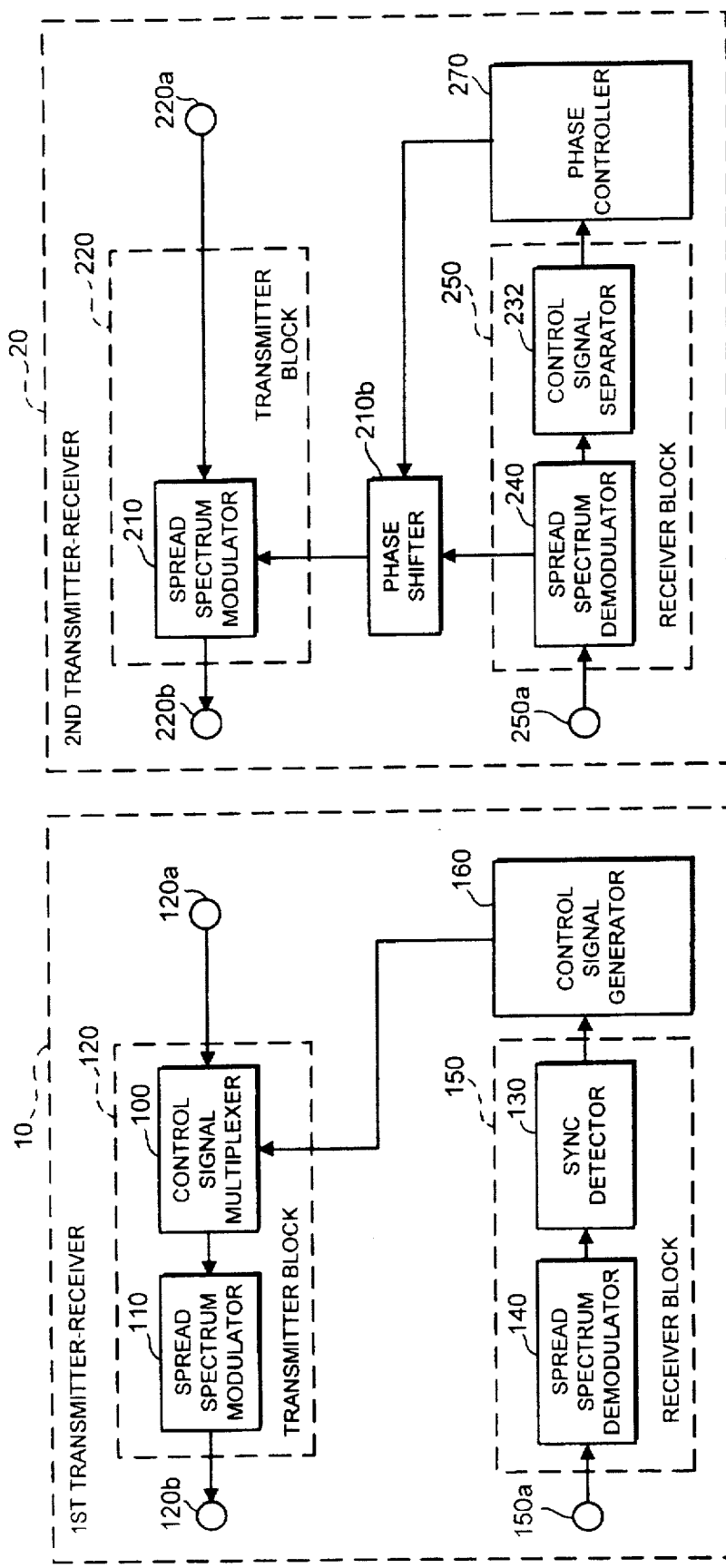
FIG. 1 is a block diagram showing the first embodiment of the present invention.

FIG. 1 is a block diagram for explaining a first embodiment of the present invention. In FIG. 1, 10 denotes a first transmitter-receiver; 120 denotes a transmitter block; 120a denotes an input terminal; 120b denotes an output terminal; 100 denotes a control signal multiplexer; 110 denotes a spread spectrum modulator; 150 denotes a receiver block; 150a denotes an input terminal of the receiver block; 140 denotes a spread spectrum demodulator; 130 denotes a synchronization detector; 160 denotes a control signal generator; 20 denotes a second transmitter-receiver; 220 denotes a transmitter block, 220a denotes an input terminal of the transmitter block; 220b denotes an output terminal of the transmitter block; 210 denotes a spread spectrum modulator; 250 denotes a receiver block; 250a denotes an input terminal of the receiver block; 240 denotes a spread spectrum modulator; 232 denotes a control signal separator; 270 denotes a phase controller; and 210b denotes a phase shifter.

Now, it is assumed that two types of PN codes which have the same code length and different generator polynomials are allotted as spread spectrum codes for the first transmitter-receiver 10 and for the second transmitter-receiver 20. In other words, a transmission signal output from the second transmitter-receiver 20 is carried out by the spread spectrum modulation using the PN code 1, while a transmission signal output from the first transmitter-receiver 10 by the spread spectrum modulation using the PN code 2.

The first transmitter-receiver 10 inputs an information signal to be transmitted to the input terminal 120a of the transmitter block. The information signal is input to the control signal multiplexer 100, and here the information signal is multiplexed with a control signal output from the control signal generator 160. The control signal output from the control signal generator 160 controls whether or not the phase of the signal should be controlled for the second transmitter-receiver 20 based on whether or not a reception synchronization is established in the receiver block 150. The information signal multiplexed on the control signal performs a spread spectrum modulation in the spread spectrum modulator 110. As mentioned above, the PN code 2 is used for the spread spectrum modulation.

A transmission signal transmitted from the second transmitter-receiver 20 is received by the input terminal 150a of the receiver block 150. Since the received signal uses the PN code 1 for the spread spectrum modulation, it is input to the spread spectrum demodulator to be processed through spread spectrum demodulation by establishing the reception synchronization on the PN code 1. The synchronization detector 130 connected to the demodulator 140 detects whether the synchronization is established or not so as to output the signal to the control signal generator 160.

The second transmitter-receiver 20 receives the transmission signal transmitted from the first transmitter-receiver 10 and inputs it to the input terminal 250a of the receiver block 250. Since the received signal uses the PN code 2 for the spread spectrum modulation, it is input to the spread spectrum demodulator 240 to be processed through the spread spectrum demodulation by establishing the reception synchronization on the PN code 2. The control signal separator 232 connected to the output of the demodulator 240 separates the control signal multiplexed in the received signal in the first transmitter-receiver 10 from the received signal to output a signal which judges whether or not the phase of the signal should be controlled to the phase controller 270.

An information signal to be transmitted is input to the input terminal 220a of the transmitter block 220. The information signal is processed through spread spectrum modulation in the spread spectrum modulator 210. Although the PN code 1 is used for the spread spectrum modulation, the spread spectrum modulator 210 is connected to the spread spectrum demodulator 240 via the phase shifter 210b. That is, although the PN code 1 is used for the spread spectrum modulation, a clock signal, which is synchronized with the spread spectrum demodulator 240, is used for generating the PN code 1. Therefore, the PN code used in the spread spectrum modulator 210 takes the phase synchronization with the PN code which is used in the spread spectrum modulator of the first transmitter-receiver 10.

The phase shifter 210b is controlled by the phase controller 270 to shift the phase of the clock signal which generates the PN code 1. Since when the phase of the clock signal is shifted, the phase of the PN code 1 in the modulator 210 is shifted as well, the transmission signal transmitted from the second transmitter-receiver 20 shifts the phase of the PN code 1 for the spread spectrum modulation.

Here, it will be briefly discussed below that the even though there are many signals with the same PN code which are carried out by spread spectrum modulation, they can be separated using the phase shifter 210.

First, in the case of one-to-one communication, the first transmitter-receiver 10 and the second transmitter-receiver 20 each is a possible communication system. Thus, it is easily understood that since the different PN codes are used for spread spectrum modulation, the transmission signals transmitted from the first and the second transmitter-receivers 10, 20 can be communicated without any interference.

Figure 2:
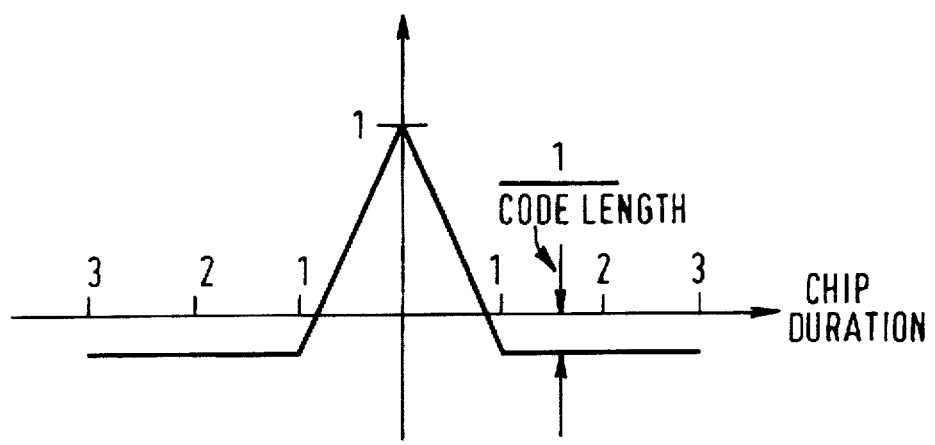
FIG. 2 is a diagram explaining the auto-correlation of the PN code used for the embodiment as shown in FIG. 1.

Next, a one-to-many communication, where one unit of the first transmitter-receiver 10 has several receiver blocks and plural units of the second transmitter-receiver 20 are involved, will be discussed. In this case, there are many transmission signals from a plurality of second transmitter-receivers 20 with the same PN code which are carried out by spread spectrum modulation, while there is one transmission signal from the first transmitter-receiver 10. Interference occur when the PN code phase differences between the received signals at the input terminal of the first transmitter-receiver 10 become less than one chip duration. This is easily understood from the auto-correlation function of the PN code. As an example of the PN code, the auto-correlation function in the M-sequence code is shown in FIG. 2. Note that even though there are two PN codes which are the same, if the relative phase differences between the M-sequence codes are more than one chip duration, the correlation value of them will be a reciprocal of the code length and the signals will have small correlations.

That is, at the input terminal of the first transmitter-receiver 10, when the relative phase differences between the PN codes of the transmission signals transmitted from the second transmitter-receiver 20 become less than one chip duration and it is impossible to receive the signals in the receiver block of the first transmitter-receiver 10, the synchronization detector 130 of the first transmitter-receiver 10 transmits information indicating that it is impossible to establish synchronization to the control signal generator 160. The control signal generator 160 receives the information and generates the control signal used for shifting the phase of the clock signal. The control signal is transmitted to the control signal multiplexer 100 of the transmitter block for transmission to the second transmitter-receiver 20 together with the information signal. Since only one transmission signal is input to the transmitter block of the second transmitter-receiver 20, the reception synchronization is easily established. The control signal separator 232 separates the control signal from the received signal, which is demodulated along with the establishment of the reception synchronization, and outputs the control signal for controlling the phase of the clock signal to the phase controller 270. The phase controller 270 receiving the signal controls the phase shifter 210b to shift the phase of the clock signal.

An absolute phase difference arises between the PN code transmitted from the second transmitter-receiver 20 before control has been made and another PN code received after control has been made. Therefore, the relative phase differences arising in the various PN codes arrive at the input terminal of the first transmitter-receiver 10. If relative phase differences of more than one chip duration arise among the PN codes, the first transmitter-receiver 10 will be able to establish reception synchronization. When it cannot establish reception synchronization, it may repeat the same process. However, if the phase amounts of the phase shifter 210b controlled by the phase controller 270 are the same in the multiple second transmitter-receivers 20, it will be hard to establish synchronization. So, it is better to use different phase values or random phases in each second transmitter-receiver 20.

In this embodiment, the frequency band used for the transmission between the first transmitter-receiver 10 and the second transmitter-receiver 20 is not limited. However, as a matter of course, it does not matter at all in the embodiment that either the same frequency band or a different frequency band is used for transmission.

Figure 3A:
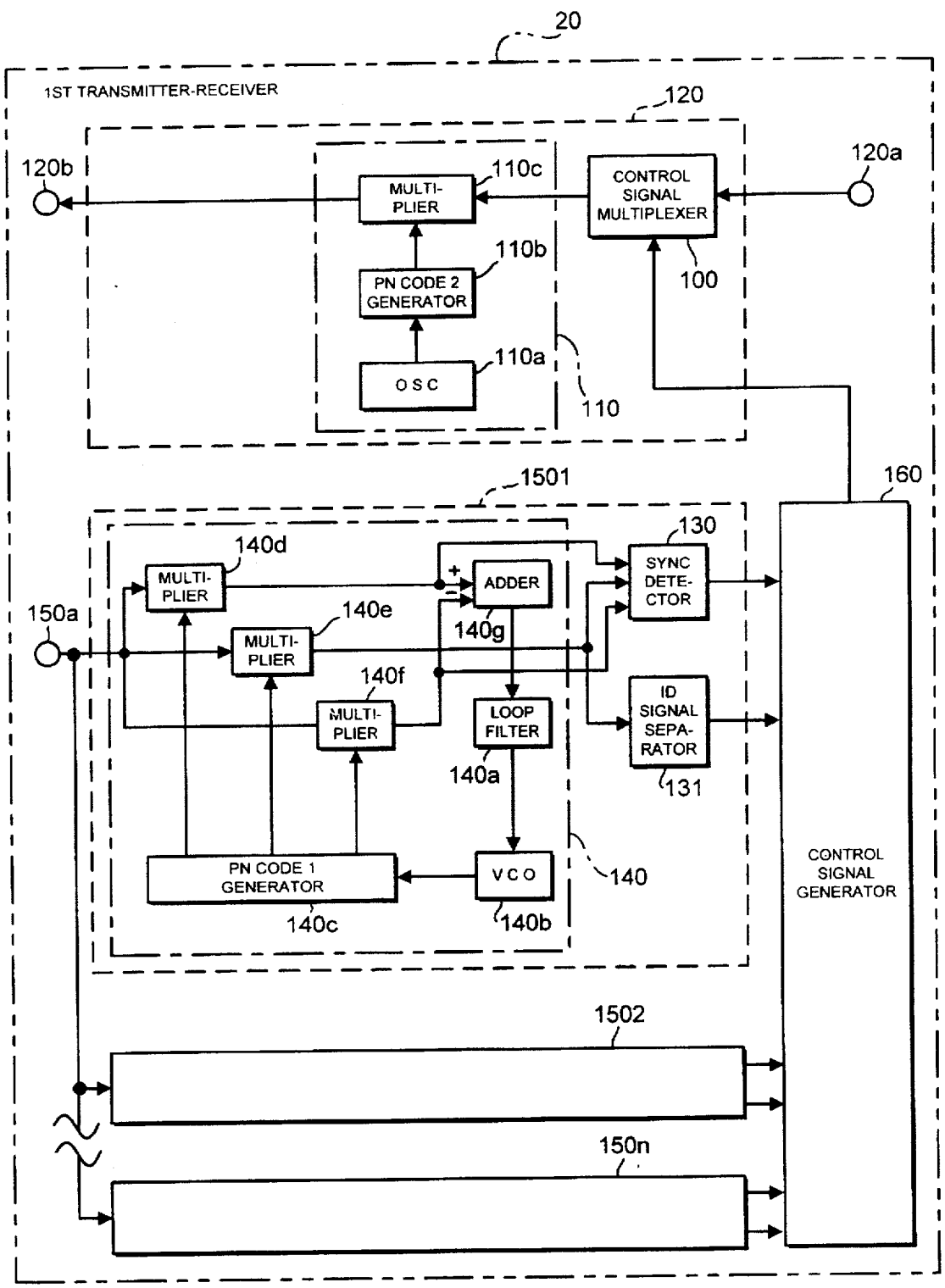
FIG. 3 is a block diagram showing the second embodiment of the present invention.
Figure 3B:
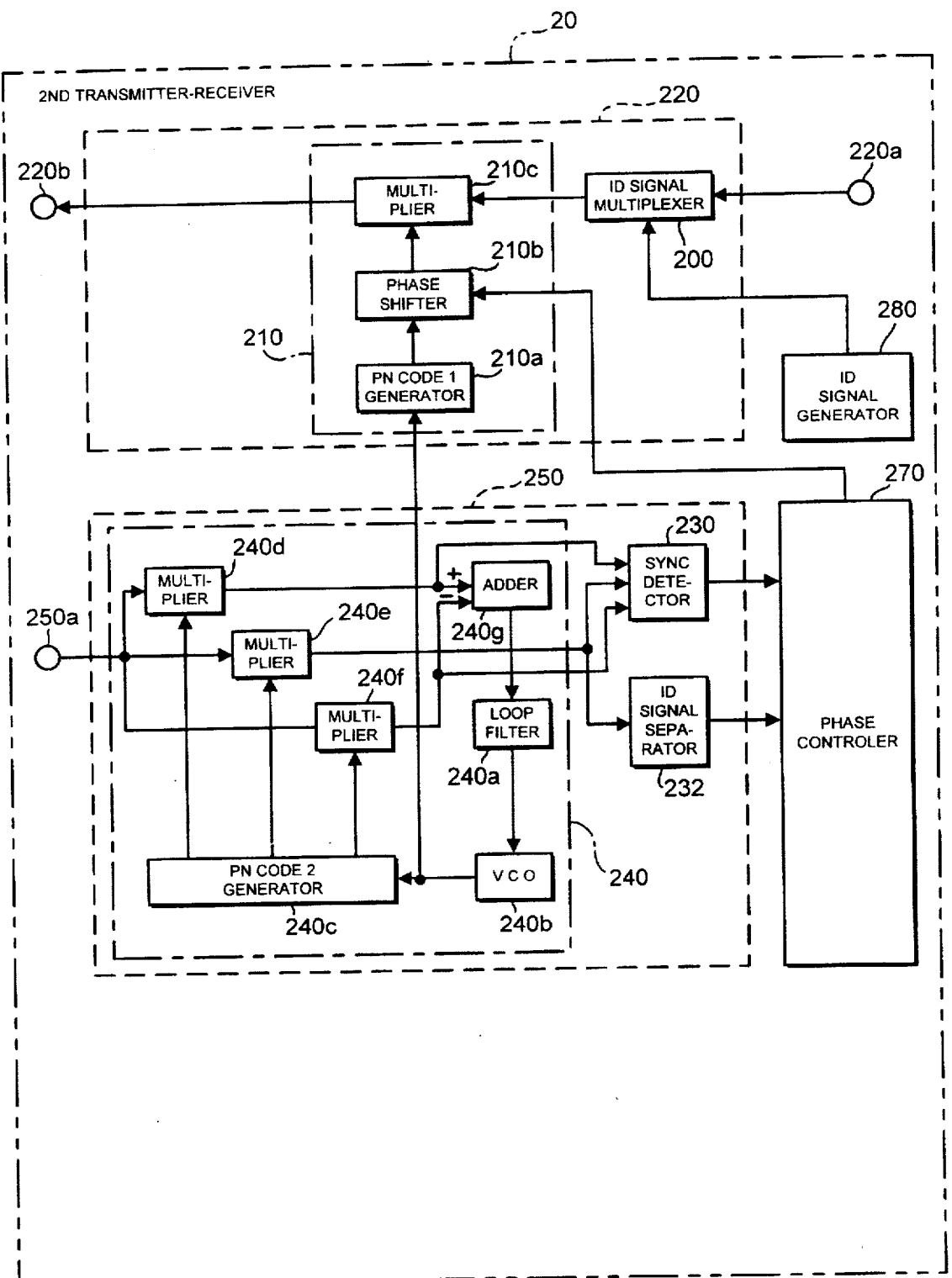

Next, the second embodiment of the present invention will be explained hereinafter referring to FIG. 3. In FIG. 3, 10 denotes the first transmitter-receiver, while 20 denotes the second transmitter-receiver. Like the embodiment in FIG. 1, two types of PN codes having the same code length and different generator polynomials are allotted, one spread spectrum code for the first transmitter-receiver 10 and another spread spectrum code for the second transmitter-receiver 20. That is, the transmission signal output from the second transmitter-receiver 20 is carried out by a spread spectrum modulation using the PN code 1, and the transmission signal output from the transmitter-receiver 10 is carried out by a spread spectrum modulation using the PN code 2.

First, the elements of the first transmitter-receiver 10 will be explained and the flow of and the operation of the signal will be also explained in detail. 100 denotes a control signal multiplexer; 110 denotes a spread spectrum modulator; 110a denotes an oscillator; 110b denotes a PN code 1 generator; 110c denotes a multiplier; 120 denotes a transmitter block; 120a denotes an input terminal of the transmitter block; 120b denotes an output terminal of the transmitter block; 130 denotes a synchronization detector; 131 denotes an identification signal separator; 140 denotes a spread spectrum demodulator; 140a denotes a loop filter; 140b denotes a voltage controlled oscillator; 140c denotes a PN code 1 generator; 140d, 140e and 140f denote multipliers; 140g denotes an adder; 1501 through 150n denote receiver blocks; 150a denotes an input terminal of the receiver block; and L60 denotes a control signal generator.

In the transmitter block 120, an information signal is input to the input terminal 120a of the transmitter block 120. The information signal can be either a non-modulated signal or a primary modulated signal. The information signal is multiplexed with the control signal output from the control signal generator 160 in the control signal multiplexer 100.

The PN code 2 generator 110b is operated by the oscillation signal of the oscillator 110a serving as a clock signal.

The output signal of the PN code 2 generator 110b is input to the multiplier 110c, wherein the output signal of the control signal multiplexer 100 is carried out by the spread spectrum modulation. The spread spectrum modulation signal is then supplied to the output terminal 120b for transmission from the transmitter block 120.

In the receiver blocks 1501, 1502 through 150n, since each of them has same construction, only the receiver block 1501 will be explained. Further, the spread spectrum demodulator 140 is similar to a delay locked loop which is commonly used.

Figure 4:
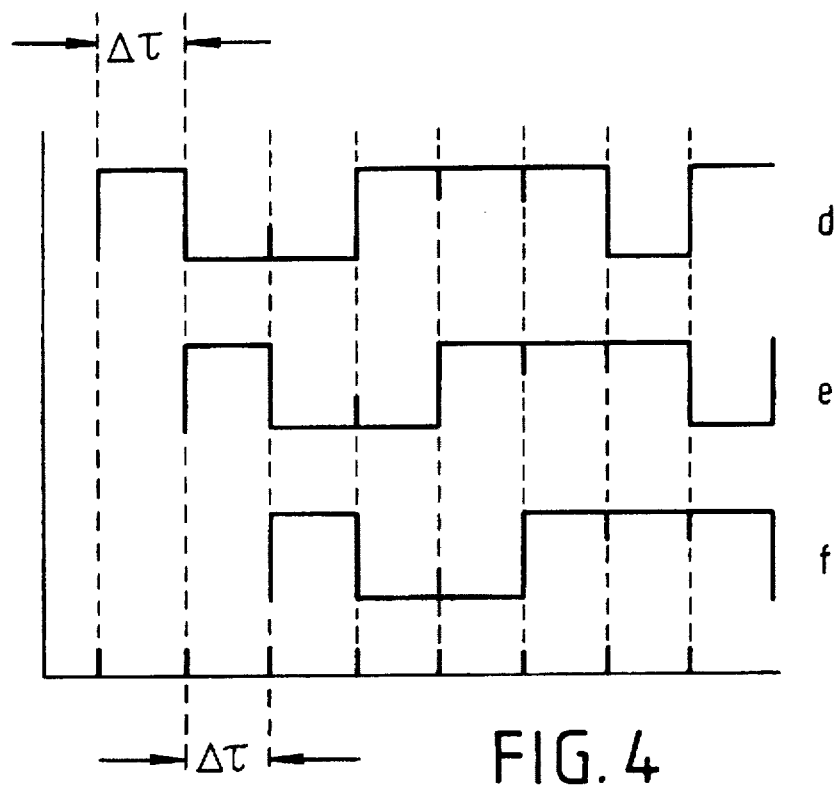
FIG. 4 is a diagram explaining the phase of the PN code of M sequence code used for the embodiment as shown in FIG. 3.

First, the receiving signal is input to the input terminal 150a of the receiver block 1501, and then applied to each of the multipliers 140d through 140f. Here, the received signal is multiplied with the PN code 1 output from the PN code 1 generator 140c, but each of the PN codes 1 which are multiplied in the multipliers 140d through 140f has a relative phase difference. Generally, the PN codes having phase differences of more than one chip duration are sequentially multiplied in the multipliers from 140d to 140f. The states are shown in FIG. 4. In FIG. 4, the tertiary M sequence codes follow the example of the PN codes, and d, e, and f each are PN codes having phase differences of more than one chip duration. $\Delta\tau$ represents the relative difference of d, e and f; in this case the phase difference is just one chip duration. An advance phase d to e is input to the multiplier 140d, and a delay phase f to e is input to the multiplier 140f. The outputs of the multipliers 140d through 140f are input to the synchronization detector 130, the outputs of the multipliers 140d and 140f are input to the adder 140g, and the output of the multiplier 140e is input to the identification signal separator 131.

The adder 140g serves as a delay discriminator by subtracting the output of the multiplier 140f from the output of the multiplier 140d. The delay discriminator has an S-curve characteristic in response to the time. The loop filter 140a filters the output signal of the adder 140g and applies a voltage to the voltage controlled oscillator. The oscillation frequency of the voltage controlled oscillator 140b is controlled so that the voltage level approaches the center of the S-curve characteristic. Since the PN code 1 generator 140c is operated by the output signal from the voltage controlled oscillator 140 as the clock signal, the chip rate of the PN code 1 is shifted to synchronize with the PN code 1 of the received signal input to the input terminal 150a of the receiver block.

If the synchronization detector 130 acts like a level comparator, for example, it compares the output amplitudes of three multipliers 140d through 140f, and it will be possible to judge the establishment of the synchronization acquisition when the output amplitude level of the multiplier 140e is larger than the output amplitudes of the other two multipliers 140d and 140f. When the synchronization acquisition is established, a spread spectrum demodulated signal is output from the output terminal of the multiplier 140e and input to the identification signal separator 131. The identification signal separator 131 separates the multiplexed identification signal from the spread spectrum demodulated signal.

Figure 5:
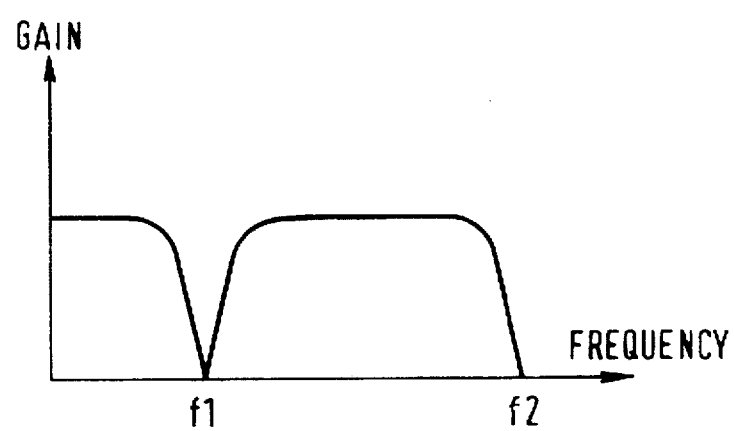
FIG. 5 is a diagram explaining the separation of the multiplexed identification signal as shown in FIG. 3.

An example of a separated identification signal is shown in FIG. 5. For instance, it is assumed that the frequency band of the information signal is defined over any frequency f1 to f2, and the frequency band of the identification signal being multiplexed is defined below as f1. Here, f1<f2. When the frequencies of the multiplexed information signal and identification signal are divided, a low pass filter is used for the identification signal separator. This decides how the identification signal multiplexer of the transmitter-receiver involved in the transmission is constructed. Here, multiplexing by frequency division is shown; however, any multiplexing method can be used.

The output signal of the synchronization detector 130 and the output signal of the identification signal separator 131 are input to the control signal generator 160. From these input signals, the output signal of the synchronization detector 130 judges the establishment of the synchronization acquisition and the output signal, or the identification signal separator 131 grasps the context of the identification signal multiplexed by the output signal. If a signal showing the transmitting source is used for the identification signal, it is possible to decide the other transmitter-receiver when the synchronization acquisition is established. Accordingly, the control signal generator 160 judges how to control the PN code phase transmitted from the other transmitter-receiver and outputs the control signal to the control signal multiplexer 100 inside the transmitter block 120.

Next, the elements of the second transmitter-receiver 20 will be explained and its signal flow and operation will be also explained in detail. 200 denotes an identification signal multiplexer; 210 denotes a spread spectrum modulator; 210a denotes a PN code 1 generator; 210b denotes a phase shifter; 210c denotes a multiplier; 220 denotes a transmitter block; 220a denotes an input terminal of the transmitter block; 220b denotes an output terminal of the transmitter block; 230 denotes a synchronization detector; 232 denotes a control signal separator; 240 denotes a spread spectrum demodulator; 240a denotes a loop filter; 240b denotes a voltage controlled oscillator; 240c denotes a PN code 2 generator; 240d, 240e and 240f denote multipliers; 240g denotes an adder; 250 denotes a receiver block; 250a denotes an input terminal of the receiver block; 270 denotes a phase controller; and 280 denotes an identification signal generator.

In the transmitter block 220, an information signal is input to the input terminal 220a of the transmitter block. The information signal can be either a non-modulated signal or a primary modulated signal. The identification signal output from the identification signal generator 280 is multiplexed to the information signal using the identification signal multiplexer 200. The identification signal can be any signal if the transmitting sources of the signals can be determined in the first transmitter-receiver 10.

The PN code 1 generator 210b is operated by the output signal of the voltage controlled oscillator 240b inside the receiver block 250 as the clock signal. The phase of the output signal of the PN code 1 generator 210a is controlled by the phase shifter 210b, and the signal is then input to the multiplier 210c. Here, the output signal of the identification signal multiplexer 200 is spread spectrum modulated and output to the output terminal 220b of the transmitter block 220 as the transmitting signal.

The construction of the receiver block 220 is almost the same as the receiver block 1501 of the first transmitter-receiver 10. There are two differences. One point is that the identification signal separator 131 is used in the first transmitter-receiver 10, while the control signal separator 232 is used in the second transmitter-receiver 20. However, only the content of the multiplexed signal differs between them, so the explanation of the control signal separator 232 is not shown here. The other point is that the output signal of the voltage controlled oscillator is used as the clock signal of the PN code 1 generator 140b for the first transmitter-receiver 10. Regarding this point, the operation of the two receiver blocks is the same, so the explanation of the receiver block 250 is also not shown here.

Figure 6:
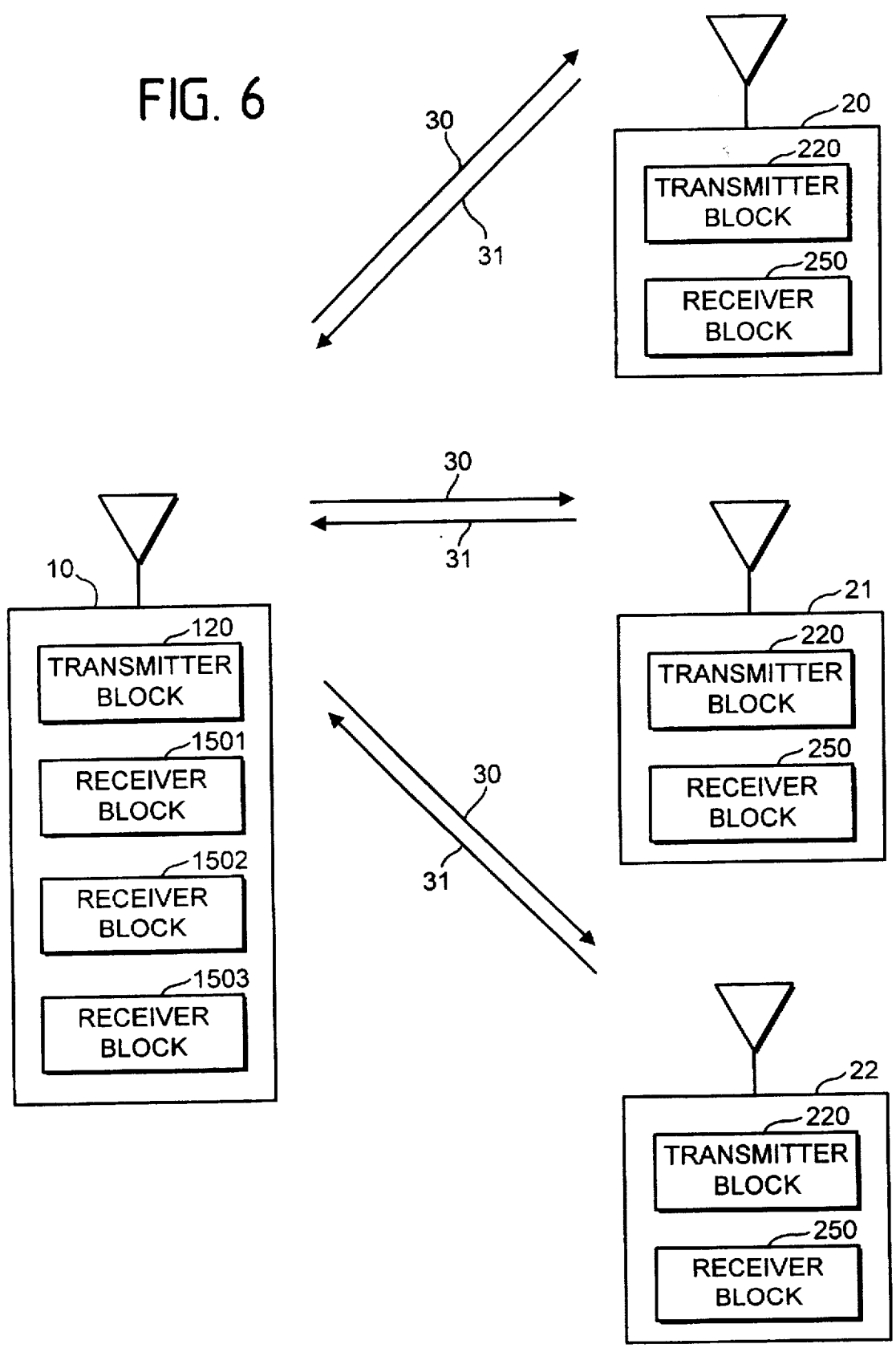
FIG. 6 is a diagram explaining the system construction of the transmitter-receiver as shown in FIG. 3.

The flow of the signals and the operation of the circuits have been described above. In a one-to-many type communication, the actual process of establishing the synchronization acquisition will be explained hereinafter. But, for simplification, it is assumed that the system construction of the transmitter-receiver, as shown in FIG. 3, has one first transmitter-receiver 10 and three second transmitter-receivers 20 as shown in FIG. 6. In FIG. 6, 10 denotes a first transmitter-receiver; 120 denotes a transmitter block; 1501, 1502 and 1503 denote receiver blocks; 20, 21 and 22 denote second transmitter-receivers; 220 denotes a transmitter block; and 250 denotes a receiver block. Here, arrows 30 and 31 show the directions of the transmission signals. That is, 30 is the signal transmitted from the transmitter block of the first transmitter-receiver 10 to each of the receiver blocks of the second transmitter-receivers 20, 21 and 22, whose spread spectrum is modulated with the PN code 2. 31 is the signal transmitted from the transmitter blocks of each of the second transmitter-receivers 20, 21 and 22 to the first transmitter-receiver 10, whose spread spectrum is modulated with the PN code 1.

It is assumed that the power supplies of all transmitter-receivers are turned off. In this case, the transmissions of all transmitter-receivers are started and the synchronization acquisitions for receiving are simultaneously started. First, the process of synchronization acquisition until each of the second transmitter-receivers 20, 21 and 22 perform reception synchronization of the transmitted signals from the first transmitter-receiver 10 will be explained.

The first transmitter-receiver 10 multiplexes the control signal to the information signal sent to the input terminal 120a of the transmitter block 120, carries out the spread spectrum modulation with the PN code 2, and outputs the spread spectrum modulation signal from the output terminal 120b of the transmitter block 120. Each second transmitter-receiver 20, 21 and 22 receives the transmitting signal from the first from the first transmitter-receiver 10 and leads the transmitting signal to the input terminal 220a of each respective transmitter block 220. The spread spectrum demodulator 240 establishes the synchronization acquisition, and the synchronization detector 230 transmits the establishment of the synchronization of the phase controller 270. If the control signal generator 160 of the first transmitter-receiver 10 happens to transmit a control signal to the control signal multiplexer 100 at the time the power supply is turned on, it will be possible to interpret the control signal using the control signal separators 232 of the second transmitter-receivers 20, 21 and 22. However, in this case it is assumed that a control signal is not transmitted.

Next, the process of the synchronization acquisition until the first transmitter-receiver 10 performs the reception synchronization of the signal transmitted from each of the transmitter-receivers 20, 21 and 22 will explained.

In each of the second transmitter-receivers 20, 21 and 22, the identification signal is multiplexed to the information signal sent to the input terminal 220a of the transmitter block. Here, it is assumed that, for example, the identification signal of each transmitter-receiver is defined as signal 20 in the second transmitter-receiver 20, as signal 21 in the transmitter-receiver 21 and as signal 22 in the second transmitter-receiver 22. These identification signals are carried out by spread spectrum modulation with the PN code 1 and transmitted from the output terminal 220b of the transmitter block. The PN code 1 generator 210a which generates the PN code 1 is operated by the clock frequency of the voltage controlled oscillator 240b in the receiver block. This means that in the stage when the reception synchronization acquisition of the second transmitter-receiver is established, each PN code 1 of the second transmitter-receivers 20, 21 and 22 synchronizes with the PN code 2 of the first transmitter-receiver 10. That is, the chip rate of the PN code 2 transmitted form the first transmitter-receiver is equal to the chip rate of each PN code 1 transmitted from the multiple second transmitter-receivers.

If each PN code phase arriving at the input terminal 150a of the receiver block of the first transmitter-receiver 10 has a difference of more than one chip duration, one of the spread spectrum demodulators 140 in the receiver blocks 1501 through 1503 establishes the synchronization acquisition on one of the three transmission signals, and the synchronization detector 130 transmits the establishment of the synchronization to the control signal generator 160. Then, the identification signal separator 131 transmits the name of the transmitter-receiver which is the object of the synchronization acquisition. Since the same operation is performed in two other spread spectrum demodulators 140 in the receiver blocks 1501 through 1503, all synchronization acquisitions are finally established for the three transmission signals.

Figure 7:
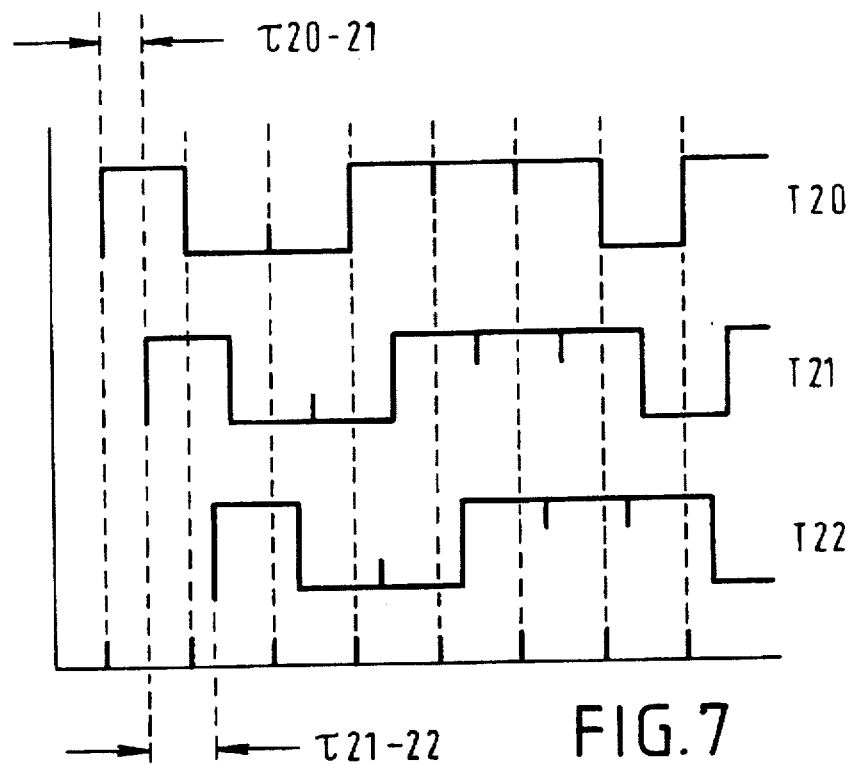
FIG. 7 is a diagram explaining the phase of the PN code of the embodiment as shown in FIG. 3.

The reception synchronizing process when the PN codes arriving at the input terminal 150a of the receiver block have no phase differences of more than one chip duration will now be explained. FIG. 7 shows the PN code 1 which is received in the input terminal of the first transmitter-receiver 10. T20 denotes the phase of the PN code 1 transmitted from the second transmitter-receiver 20. T21 denotes the phase of the PN code 1 transmitted from the second transmitter-receiver 21. Further, T22 denotes the phase of the PN code 1 transmitted from the second transmitter-receiver 22. τ20–21 denotes a phase difference between the phases T20 and T21. τ21–22 denotes a phase difference between the phases τ21 and T22.

First, three transmission signals are input to input terminal 150a of the receiver block of the first transmitter-receiver 10. However, since receiver blocks 1501 through 1503 cannot establish the synchronization acquisition, the synchronization detector 130 cannot transmit the establishment of the synchronization acquisition to the control signal generator 160. In this case, when the control signal generator 160 cannot obtain the synchronous established signal even after a certain time has passed because the power supply is turned ON, the control signal generator transmits information to the control signal multiplexer 100 indicating that the synchronization acquisition cannot be established as the control signal output. The second transmitter-receivers 20, 21 and 22, which have already established the reception synchronization receive the information and the phase controller 270 transmits the control signal for shifting the phase to the phase shifter 210b.

Figure 8:
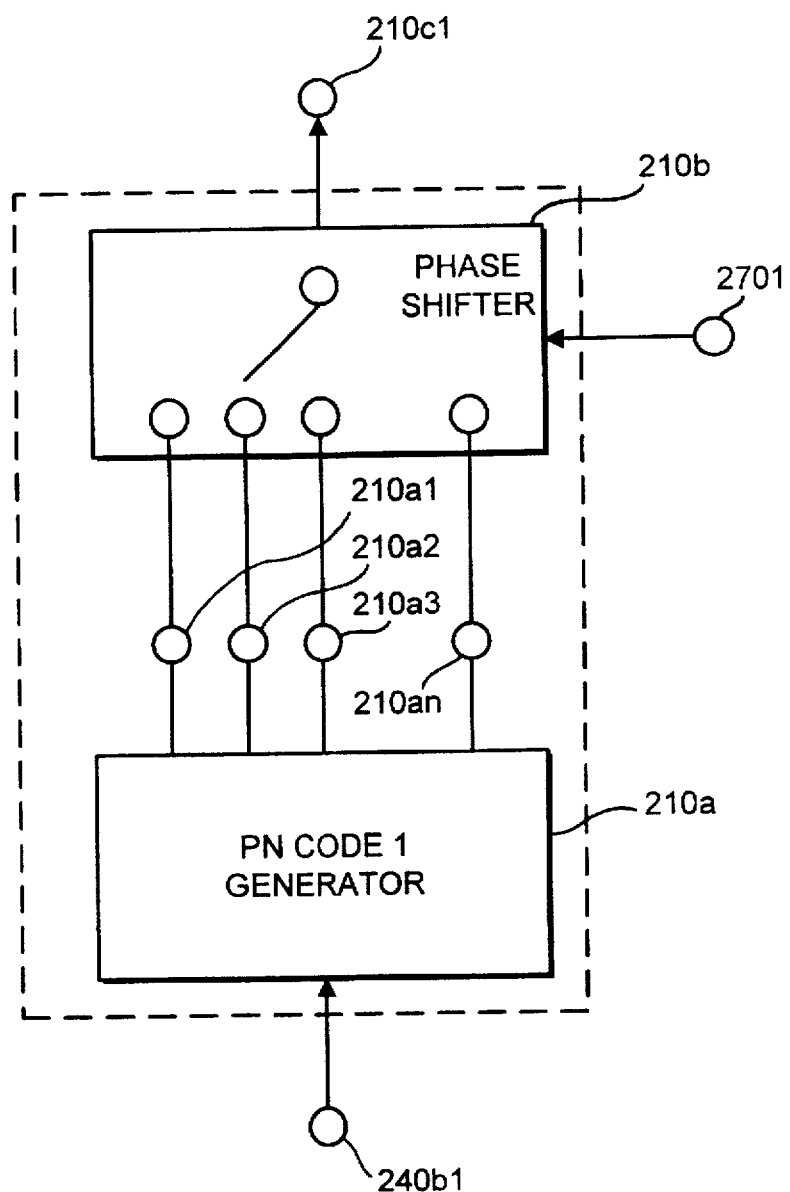
FIG. 8 is a block diagram showing the phase shifter used for the embodiment as shown in FIG. 3.

Here, it is assumed that the PN code 1 generator 210a and the phase shifter 210b have constructions as shown in FIG. 8. 240b1 is a terminal for inputting the output signal of the voltage controlled oscillator 240b, while 210c1is an output terminal of the phase shifting controller 270. The output signal is input to the multiplier 210c. 2701 is a terminal for inputting the output control signal of the phase controller 270, and 210a1through 210an are output terminals of the PN code 1 generator 210a. As it is generally known, the PN code generators are constructed using shift registers regardless of the type of system. PN codes with phases having differences greater than one chip duration are obtained from the output terminals of the shift registers, which are side by side. 210a1 through 210an correspond to the output terminals of the shift registers if the PN code is a type of M sequence code, wherein the suffix "n" indicates the number of shift registers. In this case, since there are three transmission signals which are carried out by the spread spectrum modulation with the PN code 1, at least three stages of shift registers are constructed. That is, the phase shifter 210b shifts the output terminal of the shift registers, and the transmission signal transmitted from the output terminal 220b of the transmitter block is carried out by the spread spectrum modulation with the PN code 1. Recall that PN code 1 has an absolute phase difference of more than one chip duration.

PN codes having absolute phase differences of more than one chip duration will be explained in FIG. 9. The relative phases of T21 and T22 are shown when the T20 is used as a reference phase. In this case, the phase of T21 is delayed with respect to T20 as a result of the phase control, and T22 has been processed with a phase delay control of 2 chip durations.

Figure 9:
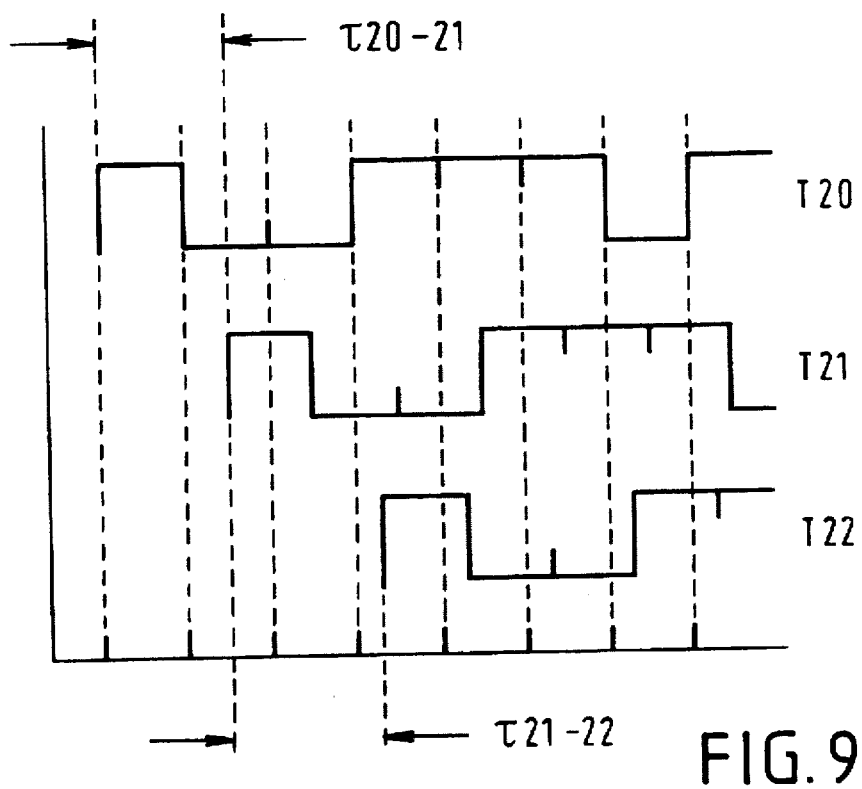
FIG. 9 is a diagram explaining the PN codes which have absolute phase differences of more than one chip duration.

FIG. 9 shows a case where a relative phase difference of more than one chip duration has occurred among three PN codes. If the phase controller 270 in each of the transmitter-receivers controls the phase shifters 210b at the same time, the relative phase differences do not arise in the PN codes transmitted from three transmitter-receivers. So, each transmitter-receiver controls the phase shifter 210b at a different time or for a different value than the phase shifters 210b of the other transmitter-receivers. For instance, when the first transmitter-receiver cannot establish the reception synchronization, it can transmit information to all of the second transmitter-receivers to control each phase shifter 210b using a random value, or it can transmit only a control signal indicating that it can not establish reception synchronization and allow the second transmitter-receiver to control the phase shifter 210b randomly on its own.

Accordingly, one of the receiver blocks 150a through 1503 establishes the synchronization acquisition with one of three transmission signals. Here, it is assumed that the receiver block 1502 of the first transmitter-receiver 10 establishes the synchronization acquisition with the transmission signal from the second transmitter-receiver 21. Then, the receiver block 1502 transmits information indicating the establishment of the synchronization acquisition to the control signal generator 160. The control signal generator 160 transmits the some information to the second transmitter-receiver 21 via the control signal multiplexer 100 and holds the state of the phase shifter 210b. Once the synchronization acquisition is established, even if the second transmitter-receiver 21 receives information indicating that it is impossible to establish the synchronization acquisition, it does not need to control the phase shifter 210b again in the future.

In this case, as shown in FIG. 9, the phase differences of more than one chip duration arise among the three phases by a single phase control operation. However, even if the phase differences of more than one chip duration do not arise from one phase control, repeating the phase control makes it possible to establish the synchronization acquisition in all the receiver blocks of the first transmitter-receiver 10. That is, a plurality of the PN codes 1 arriving at the input terminal 150a of the receiver block in the first transmitter-receiver 10 have entirely different relative phases of more than one chip duration; therefore, it will be possible to communicate without interference from the channels carrying spread spectrum modulated signals having the same PN codes.

In this embodiment, the phase shifter 210b has a switch connected to the shift register output terminal, as shown in FIG. 8. However, the shift register output can be connected to a phase shifter that shifts phases of more than one chip duration in an analog fashion as well. Further, in this embodiment, the frequency band used for transmission between the first transmitter-receiver and the second transmitter-receiver is not limited. There is no problem with using a same frequency band or a different frequency band in this embodiment.

Figure 10A:
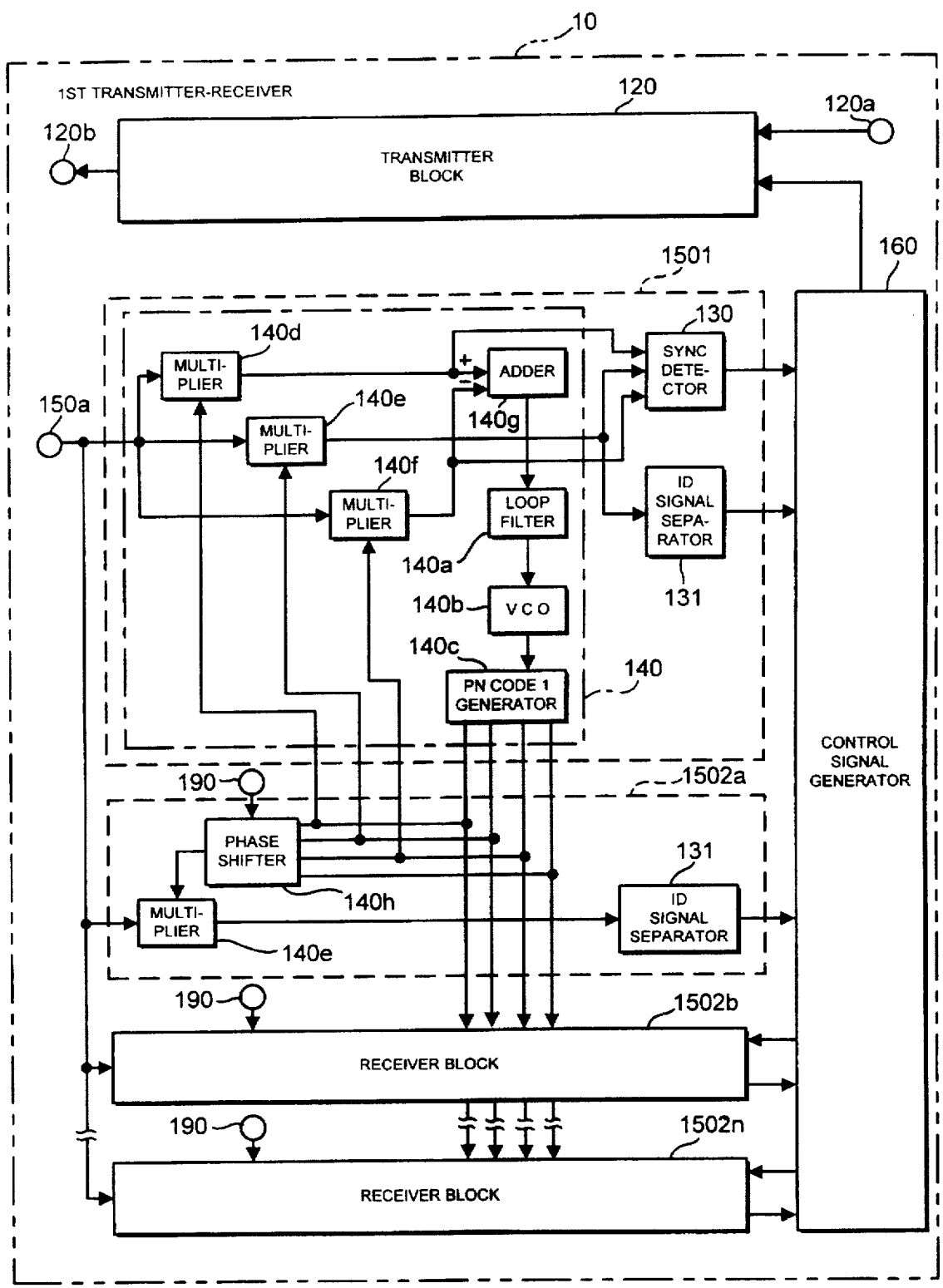
FIG. 10 is a block diagram showing the third embodiment of the present invention.
Figure 10B:
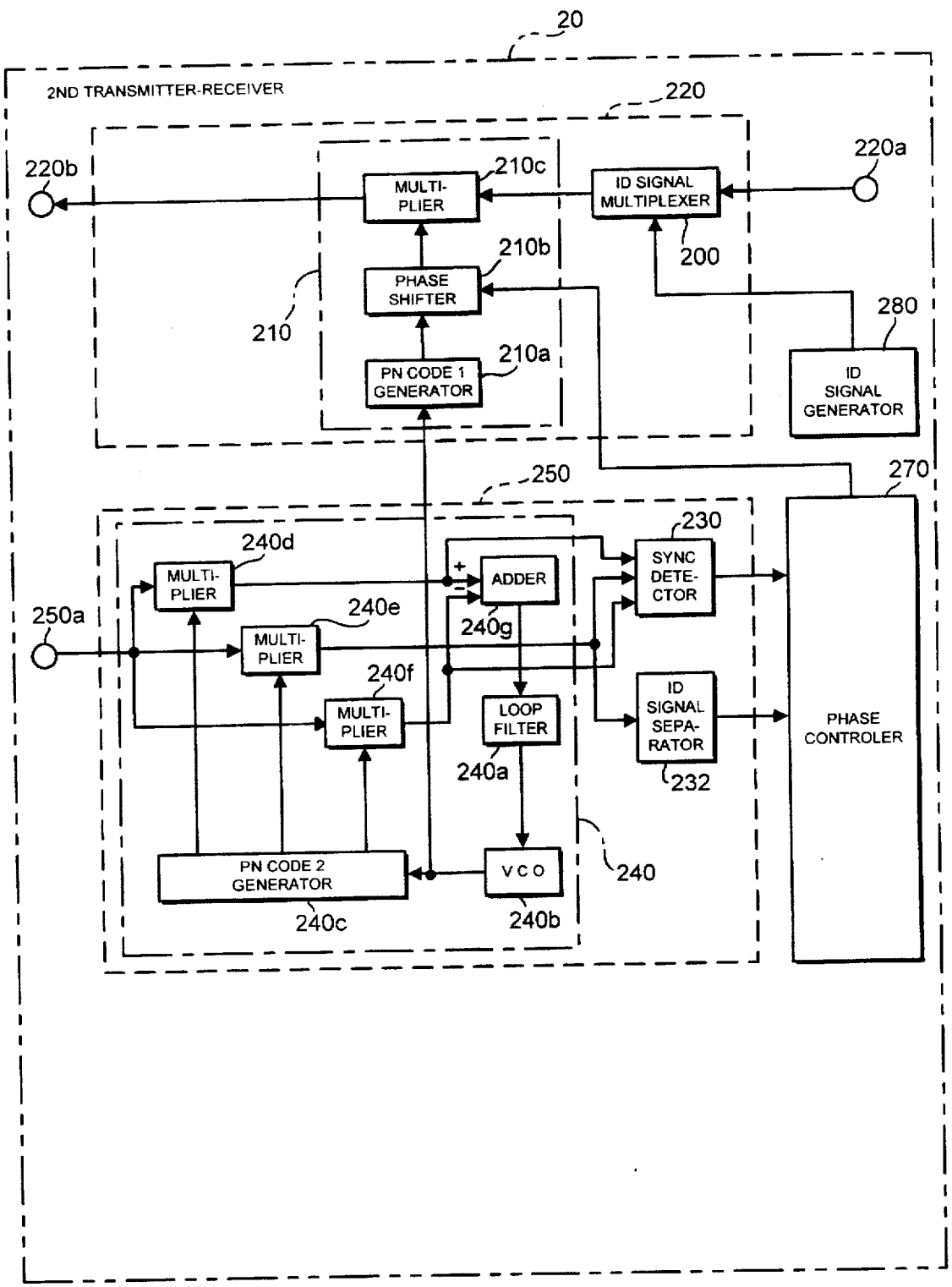

Next, the third embodiment of the present invention will be explained with reference to the block diagram shown in FIG. 10. In FIG. 10, 10 denotes a first transmitter-receiver, while 20 denotes a second transmitter-receiver. In this embodiment, similar to the embodiment explained above, two different types of PN codes having the same code lengths and different generator polynomials are allotted as spread spectrum codes for the first transmitter-receiver 10 and the second transmitter-receiver 20. That is, the transmission signal output from the second transmitter-receiver 20 is carried out by spread spectrum modulation using the PN code 1, and the transmission signal output from the first transmitter-receiver 10 is carried out by spread spectrum modulation using the PN code 2.

Only the receiver block of the first transmitter-receiver 10 is different from the second embodiment. In the second embodiment, the receiver blocks 1501 through 150n have the same constructions. However, in this embodiment, only one receiver block has the same construction as the receiver block of the embodiment 1 and other receiver blocks have simplified constructions instead. Here, only the simplified receiver blocks will be explained, and after that the process of establishing the synchronization acquisition will be explained. In FIG. 10, the same components as those shown in FIG. 3 are assigned the same reference numerals or symbols. Further, in this communication system there is one transmitter-receiver 10 and three second transmitter-receivers 20, 21 and 22.

In FIG. 10, 1502a through 1502n in the first transmitter-receiver 10 denote receiver blocks having the same constructions, 140h denotes a phase shifter; 140e denotes a multiplier; 131 denotes an identification signal separator; and 190 denotes a control terminal of the phase shifter 140h.

When the power supplies of all the transmitter-receivers are turned ON, signals start transmitting from all of the transmitter-receivers, and at the same time the synchronization acquisitions for receiving the signals also begin to operate. The synchronous capturing process until the second transmitter-receivers 20, 21 and 22 perform the reception synchronization of the signals transmitted from the first transmitter-receiver is same process as in the first embodiment, so only the synchronous capturing process until the first transmitter-receiver 10 performs the reception synchronization of the signals transmitted from the second transmitter-receivers 20, 21 and 22 will be explained here.

In second transmitter-receivers 20, 21 and 22, each identification signal is multiplexed with the information signal sent to the input terminal 220 of their respective transmitter blocks. Here, it is assumed that the identification signal of each transmitter-receiver is defined as signal 20 in the second transmitter-receiver 20, signal 21 in the second transmitter-receivers 21 and signal 22 in the second transmitter-receiver 22. These identification signals are subjected to spread spectrum modulation using the PN code 1 and transmitted from the output terminal 220b of the transmitter block 220. The PN code 1 generator 210a which generates the PN code 1 is operated by the clock frequency of the voltage controlled oscillator 240b in the receiver block 250. This means that in the stages where the reception synchronization acquisition of the second transmitter-receivers 20, 21 and 22 are established, each of the PN codes 1 of the second transmitter-receivers 20, 21 and 22 synchronize with the PN code 2 of the first transmitter-receiver 10. That is, the chip rate of the PN code 2 transmitted from the first transmitter-receiver 10 is equal to the chip rate of each PN code 1 transmitted from the second transmitter-receivers 20, 21 and 22.

Figure 11:
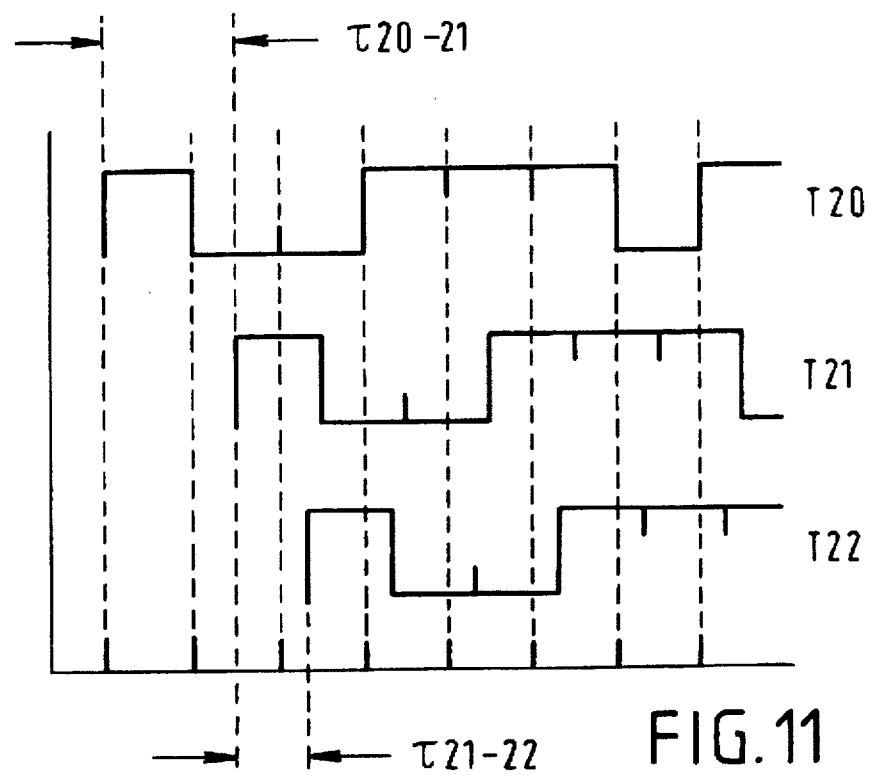
FIG. 11 is a diagram explaining the phase of the PN code in the embodiment as shown in FIG. 10.

If each of the PN code phases arriving at the input terminal 150a of the receiver block of the first transmitter-receiver 10 has a phase difference of less than one chip duration, as shown FIG. 7, this is the worst case scenario since the synchronization acquisition is not performed even in the receiver block 1501. In this case, as explained in the second embodiment, the control signal which fails to establish the synchronization acquisition is transmitted to the receiver blocks of the transmitter-receivers 20, 21 and 22 after a predetermined time. The phases of the PN codes 1 transmitted from the second transmitter-receivers 20, 21 and 22 are controlled as shown in FIG. 11 by receiving this control signal. In other words, this is a case where T20 has a phase difference of more than one chip duration from T21 and T22, but also has a phase difference of less than one chip duration from T21 and T22 if viewed from a different perspective.

During this time, the receiver block 1501 establishes the synchronization acquisition to T20, the synchronization detector 130 transmits the establishment of the synchronization to the control signal generator 160, and the identification signal, separator 131 transmits the identification signal, which is an object of the synchronization acquisition, to the control signal generator 160.

Figure 12:
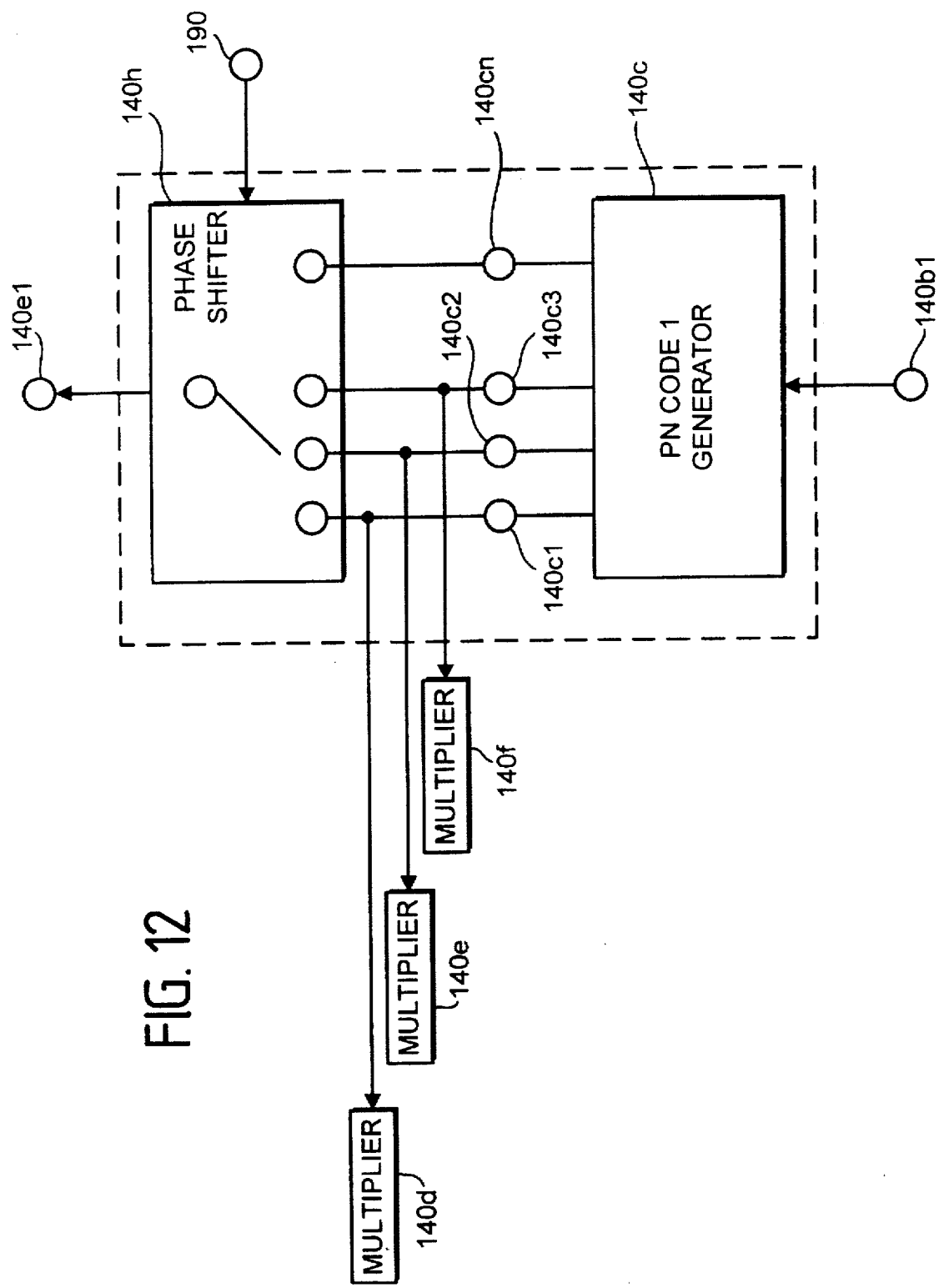
FIG. 12 is a block diagram explaining the phase shifter used in the embodiment as shown in FIG. 10.

Next, the synchronization acquisition of the receiver blocks 1502a through 1502n will be discussed. It is assumed that the phase shifter 140h includes a switch for changing over the shift register output terminals of the PN code 1 generator 140c as shown in FIG. 12.

In FIG. 12, 140d through 140f denote multipliers of the receiver block 1501; 140b1 denotes an input terminal for inputting the output signals of the voltage controlled oscillator 140b; 140c denotes a PN code 1 generator; 140e denotes an output terminal of the phase shifter 140h; 190 denotes a control terminal of the phase shifter 140h; and 140c1 through 140cn denote output terminals of the PN code 1 generator 140c. Like the second embodiment, 140c1 through 140cn correspond to the output terminals of shift registers.

Now, it is assumed that the multipliers 140d through 140f of the receiver block 1501 are connected to the output terminals 140c1 through 140c3 of the shift register in the PN code 1 generator 140. The PN code 1 appearing on terminal 140c2 is given to the multiplier 140e of the receiver block 1501 in which the synchronization acquisition has been established. When a different PN code 1 having a phase difference of more than one chip duration is selected from a terminal other than terminal 140c2 and given to the multiplier 140e, it will be possible to demodulate in other receiver blocks 1502a through 1502n. Since the phase shifter 140h only selects the PN code having a phase difference of more than one chip duration in the receiver blocks, there is no problem even if a fixed preset value is given to the control terminal 190.

However, the relative phase difference between the output terminal 140c2 of the shift register and the PN code 1 is an integer multiple of one chip duration. So, as shown in FIG. 11, it is impossible to demodulate using only the condition that the relative phase differences of the PN codes 1 transmitted from each of the second transmitter-receivers 20, 21 and 22 are greater than one chip duration.

Therefore, when the phase shifter 210b in each of the second transmitter-receivers 20, 21 and 22 has a chip shifter which shifts the phase in an analog fashion, and the phase is controlled in the phase controller 270, the relative phase differences of the PN codes transmitted from the second transmitter-receivers 20, 21 and 22 will be an integer multiple of one chip duration at the input terminal of the first transmitter-receiver 10.

Figure 13:
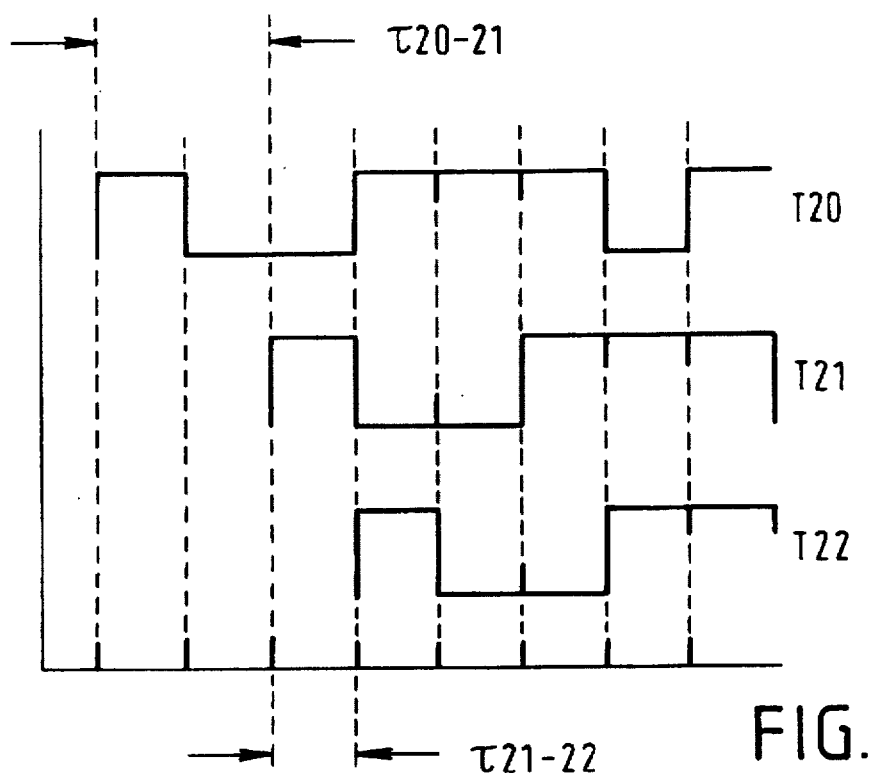
FIG. 13 is a block diagram explaining the signals having phase differences in an integer multiple of one chip duration.

The process will be shown hereinafter. First, it is assumed that the receiver block 1501 establishes the synchronization acquisition in the transmitter-receiver 20. Then, the first transmitter-receiver 10 transmits a control signal to stop the phase shift to the second transmitter-receiver 20 via the control signal generator 160. After that, when the signal showing the establishment of the synchronization is not input from the synchronization detectors 130 in the receiver blocks 1502a through 1502n after a certain time has passed, the control signal generator 160 transmits a signal indicating the failure to establish synchronization to the control signal multiplexer in the transmitter block 120. The signal is received in each of the second transmitter-receivers 20, 21 and 22. Except in the second transmitter-receiver 20, the phase controller 270 controls the phase shift to the phase shifter 210b. The PN code 1 output from the PN code 1 generator 210a is phase-shifted a small amount, input to the multiplier 210c to perform the spread spectrum modulation, and output from the output terminal 220b of the transmitter block 220. The receiver block 1502a receives the PN code 1 again; however, when the phases do not agree, a control signal for shifting the phases is transmitted to the second transmitter-receivers 20, 21 and 22 after a certain time has passed. The repetition of this process makes it possible for the PN codes 1 transmitted from the second transmitter-receivers 20, 21 and 22 to become signals the having phase differences of an integer multiple of one chip duration as shown in FIG. 13 at the input terminal of the first transmitter-receiver 10 so that all synchronization acquisitions of the receiver blocks 1502a through 1502n are established.

That is, the PN codes 1 arriving at the input terminal 150 of the receiver block in the first transmitter-receiver 10 will have a relative phase difference which is shifted more than an integer multiple of one chip duration so that it will be possible to communicate without the interference of the circuits.

Here, in this embodiment, the phase shifter 210b is an analog phase shifter. However, even if the phase shifter is used with a shift register output terminal changing switch which shifts the chip duration in a digital fashion, the same effect can be obtained. Further, the frequency band used for the transmission between the first transmitter-receiver and the second transmitter-receiver is not limited; either the same or different frequency bands can be used.

Figure 14A:
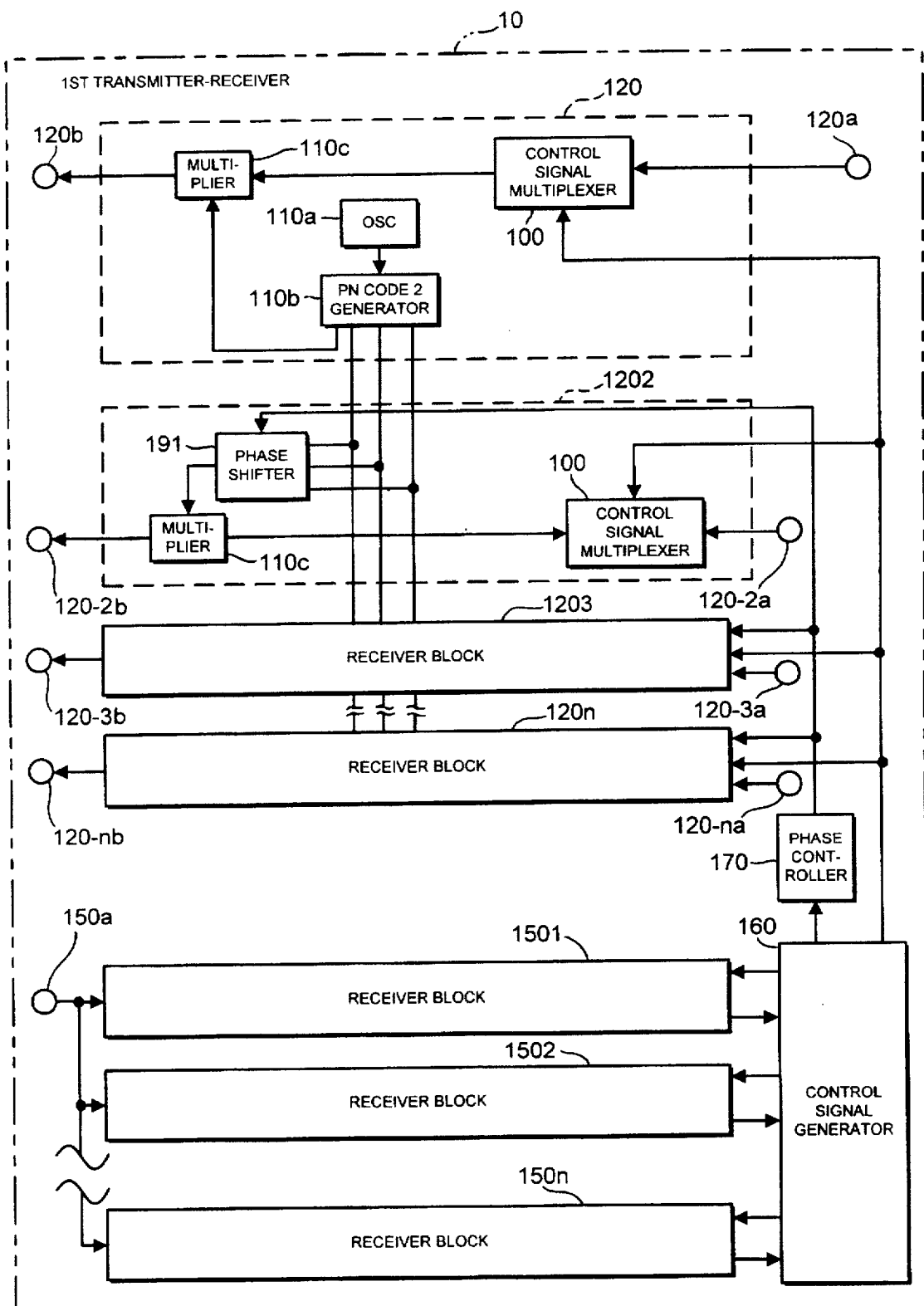
FIG. 14 is a block diagram explaining the fourth embodiment of the present invention.
Figure 14B:
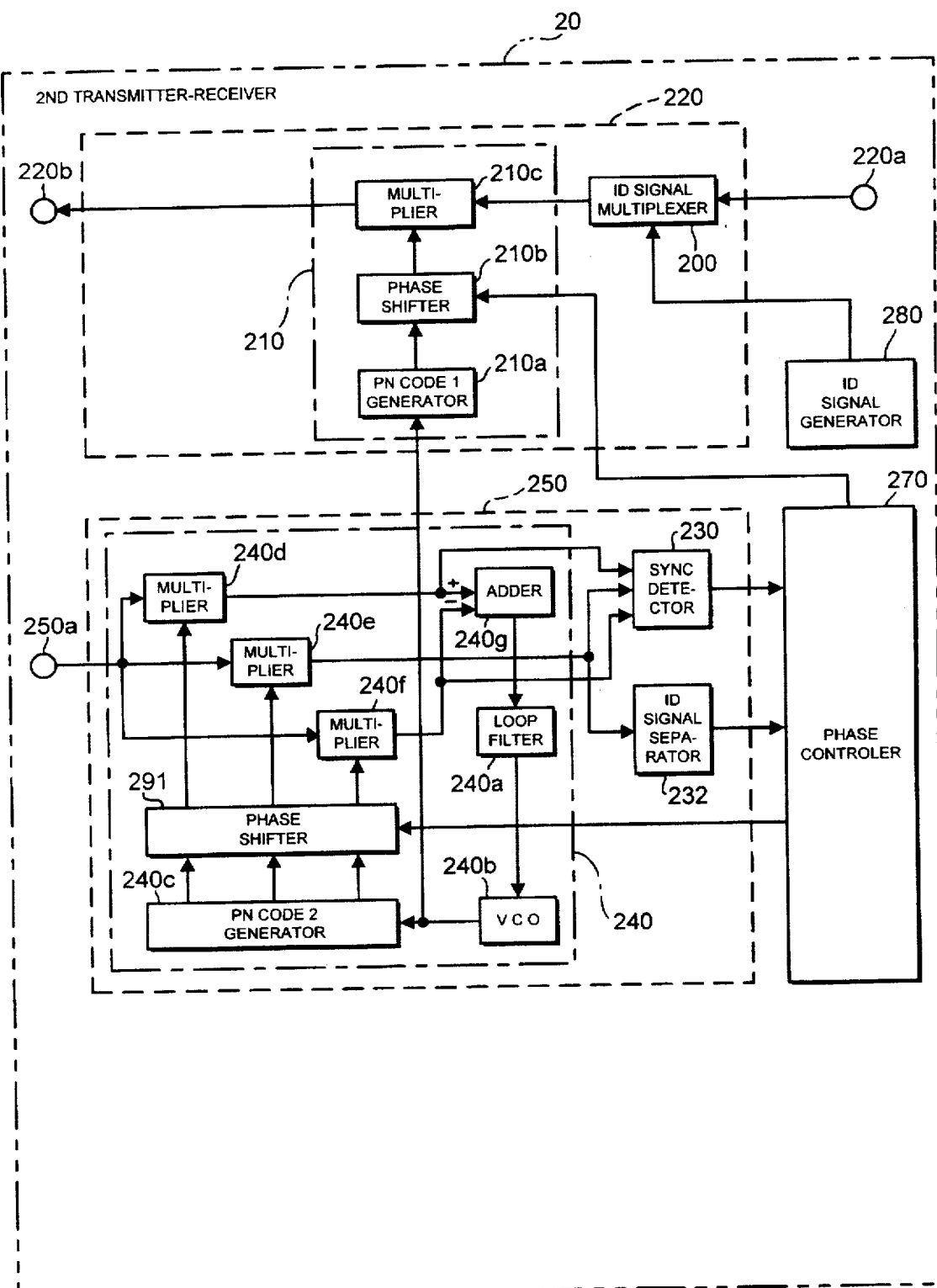

The fourth embodiment will be explained hereinafter with reference to FIG. 14. In FIG. 14, 10 denotes a first transmitter-receiver, while 20 denotes a second transmitter-receiver. In this embodiment, like the embodiments mentioned above, two different types of PN codes having the same code length and different generator polynomials are allotted as spread spectrum codes for the first transmitter-receiver 10 and for the second transmitter-receiver 20. The transmission signal output from the second transmitter-receiver 20 is carried out by spread spectrum modulation using the PN code 1, and the transmission signal output from the first transmitter-receiver 10 is carried out the spread spectrum modulation using the PN code 2.

The transmitter block of the first transmitter-receiver 10 and the receiver block of the second transmitter-receiver are different from other embodiments. In the first transmitter-receiver 10, the transducing part 120 has the same construction in both the second and third embodiments; however, in this embodiment only one transmitter block has the same construction as that of the second or third embodiment, and the other transmitter blocks have simplified constructions. In the above mentioned embodiments, there is only one transmission signal from the first transmitter-receiver 10 to the second transmitter-receiver; however, many transmitted signals are possible in this embodiment. Therefore, in the receiver block, receiver blocks shown in the second or third embodiment can also be used here. Further, a receiver block having the phase shifter is also used in this embodiment So, with respect to the first transmitter-receiver 10, only the simplified transmitter block will be explained. Similarly, with respect to the second transmitter-receiver, only the phase shifter added in the receiver block will be explained. In FIG. 14, the same components as those in FIG. 3 are assigned with the same reference numerals or symbols.

In FIG. 14, 120 and 1202 denote transmitter blocks in the first transmitter-receiver 10, having the same construction as that used for the first transmitter-receiver 10 in the second and third embodiments. 1203 through 120n denote simplified transmitter blocks in the first transmitter-receiver having the same constructions. 191 denotes a phase shifter; 110c denotes a multiplier, 100 denotes a control signal multiplexer; 1202a through 120na denote input terminals of the transmitter blocks 1202 through 120n; 1202b through 120nb denote output terminals of the transmitter blocks 1202 through 120n; and 170 denotes a phase controller. In the second transmitter-receiver, 2501 denotes a receiver block and 291 denotes a phase shifter.

In this embodiment, when the power supplies of all transmitter-receivers are turned ON at the same time, signals begin to transmit only from the transmitter block 120 in the first transmitter-receiver. In this case, the synchronization acquisition processes until each of the second transmitter-receivers 20, 21 and 22 perform the reception synchronization of the signals transmitted from the first transmitter-receiver and until the first transmitter-receiver 10 performs the reception synchronization of the signals transmitted from each of the second transmitter-receivers 20, 21 and 22 are same as those explained in embodiment 2 or embodiment 3. So, the process of transmitting the signal to the second transmitter-receiver when many signals need to be transmitted from the first transmitter-receiver 10 will be explained hereinafter.

First, it is assumed that through a request signal it will be necessary to keep the second channel to the second transmitter-receiver separate from the first transmitter-receiver 10. And it is assumed that when information is transmitted to the second transmitter-receiver 21, the generated request signal is sent to the control signal generator 160 from some other generator. Since the control signal generator 160 defines the second transmitter-receivers which are receiving objects of each of the receiver blocks 1501 through 150n, the control signal for controlling the phase shifter 191 of the transmitter block 1202 to the phase control signal for changing the channel to the second transmitter-receiver 21 arise at the same time.

Figure 15:
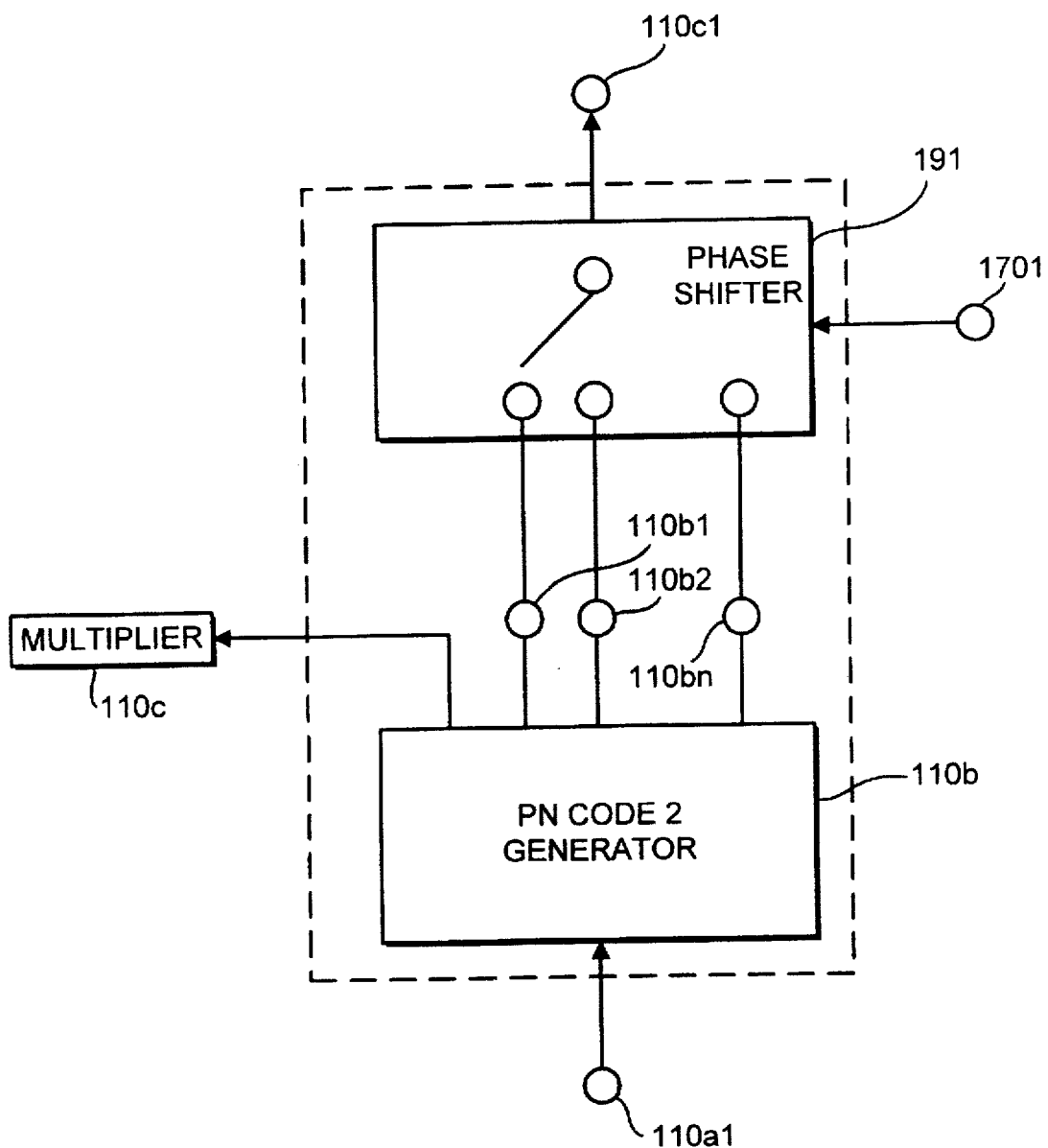
FIG. 15 is a block diagram explaining the phase shifter used in the embodiment as shown in FIG. 14.

Here, for instance, it is assumed that the phase shifter 191 includes a switch for changing the output terminal of the shift register of the PN code 2 generator 110b, as shown in FIG. 15.

110c denotes a multiplier of the receiver block 120; 110al denotes an input terminal for inputting the output signal of the oscillator 110a; 110b denotes a PN code 2 generator; 110c1 denotes an output terminal of the phase shifter 191; 1701 denotes a control terminal of the phase shifter 191; and 110b1 through 110bn denote output terminals of the PN code 2 generator 110b. Like the embodiments 2 and 3, 110b1 through 110bn correspond to the output terminals of the shift register.

Since the PN code 2 shown in 110b1 is sent to the multiplier 110c of the transmitter block 120 when the PN codes 2 are selected from the terminals of 110b2 through 110bn and given to the multiplier 110c, it will be possible to modulate in other transmitter blocks 1202 through 120n also. However, the PN codes 2 having a relative phase difference of more than one chip duration must be used in each of the transmitter blocks 1202 through 120n. Therefore, the phase controller 170 must control the phase shifter 191 in each of the transmitter blocks 1202 through 120n to have different changing points.

Now, when the phase shifter 191 selects the output terminal 110b1 of the PN code 2 generator 110b, a signal carried out by the spread spectrum modulation with the PN code 2 which has a relative phase more than one chip duration different from the PN code 2 used in the transmitter block 120 is transmitted from the transmitter block 1202.

On the other hand, the control signal generator 160 outputs a control signal for shifting the phase of the receiver block 1501 of the second transmitter-receiver 21 to the control signal multiplexer 100 of the transmitter block 120. During this time, the control signal generator 160 may output an information showing how to control the phase controller 170 as the control signal. The control signal is received by all of the second transmitter-receivers and then decoded. As a result, only the second transmitter-receiver 21 controls the phase shifter 291, as the control signal shows. Here, when the phase shifter includes a switch for changing the shift register output terminal of the PN code 2 generator as mentioned above, the channel between the transmitter block 1202 of the first transmitter-receiver and the second transmitter-receiver is connected by only changing over the switch the same as the first transmitter-receiver.

Further, in this embodiment the frequency band used for the transmission between the first transmitter-receiver and the second transmitter-receiver is not limited. Any frequency band, same or different, can be used in this embodiment.

As described above, in the spread spectrum communication apparatus according to the present invention, it is possible to multiplex many channels using only one PN code by controlling the phase of the transmitted PN code of the second transmitter-receiver. In the system where one PN code is allotted to one channel, since a lot of PN codes are not needed for each of channels, it is possible to prevent an increase in the number of stages of PN code generators and to eliminate a substantial number of circuits.

As described above, the present invention can provide an extremely preferable spread spectrum communication apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A spread spectrum communication apparatus, comprising:

a first transmitter-receiver having:

a receiver block for receiving a transmission signal which is spread spectrum modulated using a first PN code, carrying out a spread spectrum demodulation by synchronizing the received signal with a phase of the first PN code, determining whether the spread spectrum demodulated signal has synchronized with the phase of the first PN code, and then outputting a synchronization detection signal;

a control signal generator for generating a control signal for shifting the phase of the first PN code for spread spectrum modulation in a second transmitter-receiver so as to establish synchronization of signals received in the receiver block of the first transmitter-receiver based on the synchronization detection signal; and a transmitter block for transmitting to the second transmitter-receiver an information signal which is multiplexed with the control signal and spread spectrum modulated using a second PN code;

the second transmitter-receiver having:

a receiver block for receiving the transmission signal which is spread spectrum modulated in the first transmitter-receiver with the first PN code, performing a reverse spread spectrum process on the signal received by the receiver block in the second transmitter-receiver by synchronizing the phase of the received signal using the second PN code, demodulating the received signal, separating the control signal from the received signal and outputting control signal;

a phase controller for generating a phase control signal that shifts the phase of the first PN code for spread spectrum processing to establish a reception synchronization of the first transmitter-receiver, which can not establish the reception synchronization based on the control signal separated from the receiver block;

a transmitter block for transmitting an information signal for transmission by performing spread spectrum processing using the first PN code which is generated by a clock pulse synchronizing the phase of the first PN code with the spread spectrum demodulator of the receiver block; and a phase shifter connected between the receiver block and the transmitter block of the second transmitter-receiver for shifting the phase of the first PN code based on the phase control signal from the phase controller in the second transmitter-receiver so as to establish the reception synchronization of the first transmitter-receiver.

2. A spread spectrum communication apparatus, comprising:

a first demodulator for receiving a transmission signal, which is a source identification signal multiplexed on an information signal and processed in a spread spectrum operation, and performing a reverse spread spectrum operation on the signal received by the first demodulator through synchronization with a phase of a first PN code;

a first synchronization detector connected to the first demodulator for detecting whether the signal received by the first demodulator is synchronized in phase with the first PN code;

a first receiver block connected to the first demodulator, the first receiver block having an identification signal separator for separating the identification signal from the signal received by the first demodulator;

a control signal generator for generating a control signal to control the phase of a second transmitter-receiver, which can not establish reception synchronization based on the first synchronization detector and the identification signal separator;

a control signal multiplexing means for multiplexing the control signal with a first information signal for transmission;

a second PN code generator for generating a second PN code using a fixed frequency clock;

a first transmitter-receiver which is equipped with a first transmitter block having a first modulator for performing spread spectrum processing of the first information signal for transmission to which the control signal is multiplexed using the second PN code;

a second demodulator for receiving the transmission signal which is spread spectrum processed in the first transmitter-receiver and performing a reverse spread spectrum operation on the signal received by the second demodulator through synchronization with a phase of the second PN code;

a second synchronization detector for detecting whether the signal received by the second demodulator is synchronized with, the second PN code;

a second receiver block having a control signal separator for separating a control signal from the signal received by the second demodulator;

a phase controller for generating a phase control signal to control the phase of the first PN code for spread spectrum modulation based on the second synchronization detector and the control signal separator;

an identification signal generator for generating the identification signal indicating the transmitting source to the first transmitter-receiver;

an identification signal multiplexing means for multiplexing the identification signal with a second information signal for transmission;

a first PN code generator for generating the first PN code using a clock pulse synchronizing the phase with the second demodulator;

a second transmitter-receiver which is equipped with a second transmitter block having a multiplier for performing spread spectrum processing of the second information signal for transmission to which the identification signal is multiplexed using the first PN code; and a phase shifter connected between the first PN code generator, a second modulator and the phase controller for shifting the phase of the first PN code based on the phase control signal to establish the reception synchronization of the first transmitter-receiver.

3. A spread spectrum communication apparatus, comprising:

a first demodulator for receiving a transmission signal, which is a source identification signal multiplexed on an information signal and processed in a spread spectrum operation, and performing a reverse spread spectrum operation on the signal received by the first demodulator through synchronization with a phase of a first PN code;

a first synchronization detector connected to the first demodulator for detecting whether the signal received by the first demodulator is synchronized in phase with the first PN code;

a first receiver block connected to the first demodulator, the first receiver block having an identification signal separator for separating the identification signal from the signal received by the first demodulator;

a first phase shifter connected to the first demodulator for shifting the phase of the first PN code;

a first multiplier for performing reverse spread spectrum processing by inputting the signal received by the first demodulator and multiplying the signal received by the first demodulator with a first PN code whose phase is shifted in the first phase shifter;

a second synchronization detector connected to the first multiplier for detecting whether the signal received by the first multiplier is synchronized in phase with the shifted phase of the first PN code;

a second receiver block connected to the first multiplier, the second receiver block having a second identification signal separator for separating an identification signal from the signal received by the first demodulator;

a control signal generator for generating a control signal to control the phase of the second transmitter-receiver, which can not establish the reception synchronization based on the first and the second synchronization detectors and the first and the second identification signal separators;

a control signal multiplexing means for multiplexing the control signal with a first information signal for transmission;

a second PN code generator for generating a second PN code using a fixed frequency clock;

a first transmitter-receiver which is equipped with a first transmitter block having a first modulator for performing spread spectrum processing of the first information signal to which the control signal is multiplexed using the second PN code;

a third demodulator for receiving the transmission signal which is spread spectrum processed in the first transmitter-receiver and performing a reverse spread spectrum operation on the signal received by the second demodulator with a phase of the second PN code;

a third synchronization detector for detecting whether the signal received by the third demodulator synchronizes with the second PN code;

a third receiver block having a control signal separator for separating the control signal from the signal received by the third demodulator;

a phase controller for generating a phase control signal to control the phase of the first PN code for spread spectrum modulation based on the third synchronization detector and the control signal separator;

an identification signal generator for generating the identification signal for showing the transmitting source to the first transmitter-receiver;

an identification signal multiplexing means for multiplexing the identification signal with a second information signal for transmission;

a first PN code generator for generating the first PN code by a clock pulse synchronizing the phase with the third demodulator;

a second transmitter-receiver which is equipped with a second transmitter block having a second multiplier for performing spread spectrum processing of the second information signal to which the identification signal is mutiplexed using the first PN code, and a second phase shifter connected between the first PN code generator, a second modulator and the phase controller for shifting the phase of the first PN code based on the phase control signal to establish the reception synchronization of the first transmitter-receiver.

4. A spread spectrum communication apparatus, comprising:

a first demodulator for receiving a transmission signal, which is a source identification signal multiplexed on an information signal and processed in a spread spectrum operation, and performing a reverse spread spectrum operation on the signal received by the first demodulator through synchronization with a phase of a first PN code;

a first synchronization detector connected to the first demodulator for detecting whether the signal received by the first demodulator is synchronized in phase with the first PN code;

a first receiver block connected to the first demodulator, the first receiver block having an identification signal separator for separating the identification signal from the signal received by the first demodulator;

a control signal generator for generating a control signal to control the phase of the second transmitter-receiver, which can not establish the reception synchronization based on the first synchronization detector and the identification signal separator;

a first control signal multiplexing means for multiplexing the control signal with a first information signal for transmission;

a second PN code generator for generating a second PN code by using a fixed frequency clock;

a first transmitter block having a first modulator for performing spread spectrum processing of a second information signal for transmission to which the control signal is multiplexed using the second PN code;

a first phase shifter for shifting the second PN code, the first phase shifter being connected to a second control signal multiplexing means for multiplexing the control signal to the second information signal for transmission and to the second PN code generator;

a first transmitter-receiver which is equipped with second transmitter blocks having a second modulator which performs spread spectrum processing by inputting the second information signal for transmission to which the control signal is multiplexed in the second control signal multiplexing means and multiplying the second information signal for transmission with the second PN code whose phase is shifted in the first phase shifter;

a second demodulator for receiving the transmission signal which is spread spectrum processed in the first transmitter-receiver and performing a reverse spread spectrum operation on the signal received by the second demodulator through synchronization with a phase of the second PN code;

a second synchronization detector for detecting whether the signal received by the second demodulator is synchronized with the second PN code;

a second receiver block having a control signal separator for separating the control signal from the signal received by the second demodulator;

a phase controller for generating a phase control signal to control the phase of the first PN code for spread spectrum modulation based on the second synchronization detector and the control signal separator;

an identification signal generator for generating the identification signal indicating the transmitting source to the first transmitter-receiver;

an identification signal multiplexing means for multiplexing the identification signal with a second information signal for transmission;

a first PN code generator for generating the first PN code using a clock pulse synchronizing the phase with the second demodulator;

a second transmitter-receiver which is equipped with a third transmitter block having a multiplier for performing spread spectrum processing of the second information signal for transmission to which the identification signal is multiplexed using the first PN code; and a second phase shifter connected to the first PN code generator, the multiplier and the phase controller for shifting the phase of the first PN code based on the phase control signal to establish the reception synchronization of the first transmitter-receiver.

5. A spread spectrum communication apparatus, comprising:

a first demodulator for receiving a transmission signal, which is a source identification signal multiplexed on an information signal and processed in a spread spectrum operation, and performing a reverse spread spectrum operation on the signal received by the first demodulator through synchronization with a phase of a first PN code;

a first synchronization detector connected to the first demodulator for detecting whether the signal received by the first demodulator is synchronized in phase with the first PN code;

a first receiver block connected to the first demodulator, the first receiver block having an identification signal separator for separating the identification signal from the signal received by the first demodulator;

a first phase shifter connected to the first demodulator for shifting the phase of the first PN code;

a first multiplier for performing reverse spread spectrum processing by inputting the signal received by the first demodulator and multiplying the signal received by the first demodulator with a first PN code whose phase is shifted in the first phase shifter;

a second synchronization detector connected to the second demodulator for detecting whether the signal received by the first multiplier is synchronized in phase with the shifted phase of the first PN code;

a second receiver block connected to the first multiplier having a second identification signal separator for separating an identification signal from the signal received by the first multiplier;

a control signal generator for generating a control signal to control the phase of a second transmitter-receiver, which can not establish the reception synchronization based on the first and the second synchronization detector and the first and the second identification signal separator;

a first control signal multiplexing means for multiplexing the control signal with a first information signal for transmission;

a second PN code generator for generating a second PN code using a fixed frequency clock;

a first transmitter block having a second multiplier for performing spread spectrum processing of the first information signal to which the control signal is multiplexed using the second PN code;

a second control signal multiplexing means for multiplexing the control signal to a second information signal for transmission;

a second phase shifter connected to the second PN code generator for shifting the phase of the second PN code;

a first transmitter-receiver which is equipped with second transmitter blocks having the second multiplier for performing spread spectrum processing by inputting the first information signal for transmission, to which the control signal is multiplexed, in the second control signal multiplexing means and multiplying the first information signal with the second PN code whose phase is shifted in the second phase shifter;

a third demodulator for receiving the transmission signal which is spread spectrum processed in the first transmitter-receiver and performing a reverse spread spectrum operation on the signal received by the second demodulator through synchronization with a phase of the second PN code;

a third phase shifter for shifting the phase of the second PN code;

a third synchronization detector for detecting whether the signal received by the third demodulator is synchronized in phase with the second PN code;

a third receiver block having a control signal separator for separating a control signal from the signal received by the third demodulator;

a phase controller for generating a phase control signal to control the phase of the first PN code for spread spectrum modulation based on the third synchronization detector and the control signal separator;

an identification signal generator for generating the identification signal for showing the transmitting source to the first transmitter-receiver;

an identification signal multiplexing means for multiplexing the identification signal with a third information signal for transmission;

a first PN code generator for generating the first PN code by a clock pulse synchronizing the phase with the third demodulator;

a second transmitter-receiver which is equipped with a third transmitter block having a third multiplier for performing spread spectrum processing of the third information signal for transmission to which the identification signal is multiplexed using the first PN code, wherein the third phase shifter is connected to the phase control means for shifting the phase of the second PN code based on the phase control signal output from the third receiver block to select and receive one of the signals transmitted from the second transmitter blocks; and a fourth phase shifter connected to the first PN code generator, the third multiplier and the phase controller for shifting the phase of the first PN code based on the phase control signal to establish the reception synchronization of the first transmitter-receiver.

6. A spread spectrum communication apparatus as claimed in claim 1, 2 or 4 wherein the phase shifter for shifting the first PN code phase of the second transmitter-receiver includes means for shifting a phase dispersively.

7. A spread spectrum communication apparatus as claimed in any one of claims 1 through 5, wherein the phase shifter for shifting the first PN code phase of the second transmitter-receiver includes means for shifting a phase continuously.

8. A spread spectrum communication apparatus as claimed in any one of claims 1 through 5, wherein the phase shifter for shifting the first PN code phase of the second transmitter-receiver includes means for shifting a phase continuously.

9. A spread spectrum communication apparatus as claimed in any one of claims 1 through 5, wherein the same frequency bands are adopted for the transmission and the reception of both the first and the second transmitter-receivers.

10. A spread spectrum communication apparatus as claimed in any one of claims 1 through 5, wherein different frequency bands are adopted for the transmission and the reception of both the first and the second transmitter-receivers.

* * * * *